United States Patent
Lidor et al.

(10) Patent No.: US 8,738,512 B2
(45) Date of Patent: *May 27, 2014

(54) BLOCK PLACING TOOL FOR BUILDING A USER-DEFINED ALGORITHM FOR ELECTRONIC TRADING

(71) Applicant: Trading Technologies International, Inc., Chicago, IL (US)

(72) Inventors: Daniel Lidor, Chicago, IL (US); Richard Lane, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/029,464

(22) Filed: Sep. 17, 2013

(65) Prior Publication Data

US 2014/0081825 A1     Mar. 20, 2014

Related U.S. Application Data

(63) Continuation of application No. 13/014,547, filed on Jan. 26, 2011, now Pat. No. 8,566,220.

(51) Int. Cl.
    *G06Q 40/00*     (2012.01)
(52) U.S. Cl.
    USPC .......................................................... 705/37
(58) Field of Classification Search
    USPC .......................................................... 705/37
    See application file for complete search history.

(56) References Cited

U.S. PATENT DOCUMENTS

| | | |
|---|---|---|
| 4,674,044 A | 6/1987 | Kalmus et al. |
| 5,101,353 A | 3/1992 | Lupien et al. |
| 5,136,501 A | 8/1992 | Silverman et al. |
| 5,168,446 A | 12/1992 | Wiseman |
| 5,245,535 A | 9/1993 | Weiss et al. |
| 5,270,922 A | 12/1993 | Higgins |
| 5,297,031 A | 3/1994 | Gutterman et al. |
| 5,689,652 A | 11/1997 | Lupien et al. |
| 5,692,233 A | 11/1997 | Garman |
| 5,787,402 A | 7/1998 | Potter et al. |
| 5,799,287 A | 8/1998 | Dembo |
| 5,809,483 A | 9/1998 | Broka et al. |

(Continued)

FOREIGN PATENT DOCUMENTS

| | | | |
|---|---|---|---|
| AU | 200240605 | * 5/2002 | .............. G06F 17/60 |
| AU | 200240605 A1 | 6/2002 | |

(Continued)

OTHER PUBLICATIONS

Bates, John: Algorithmic Trading, Mar. 9, 2007, Dr. Dobb's, The World of Software Development, pp. 1-6.*

(Continued)

*Primary Examiner* — Bijendra K Shrestha
(74) *Attorney, Agent, or Firm* — McDonnell Boehnen Hulbert & Berghoff LLP

(57) ABSTRACT

Certain embodiments provide a block placing tool for building a user-defined algorithm for electronic trading. Certain embodiments provide for receiving by a block placing tool a selection of one or more blocks. Certain embodiments provide for receiving by a block placing tool a mapping definition including a mapping between block types and/or attributes. Certain embodiments provide for placing blocks based on a selection of blocks and a mapping definition.

12 Claims, 18 Drawing Sheets

(56) References Cited

U.S. PATENT DOCUMENTS

| | | |
|---|---|---|
| 5,819,238 A | 10/1998 | Fernholz |
| 5,873,071 A | 2/1999 | Ferstenberg et al. |
| 5,963,923 A | 10/1999 | Garber |
| 6,014,643 A | 1/2000 | Minton |
| 6,061,662 A | 5/2000 | Makivic |
| 6,064,985 A | 5/2000 | Anderson |
| 6,098,051 A | 8/2000 | Lupien et al. |
| 6,112,189 A | 8/2000 | Rickard et al. |
| 6,134,535 A | 10/2000 | Belzberg |
| 6,167,386 A | 12/2000 | Brown |
| 6,195,647 B1 | 2/2001 | Martyn et al. |
| 6,233,566 B1 | 5/2001 | Levine et al. |
| 6,272,474 B1 | 8/2001 | Garcia |
| 6,278,982 B1 | 8/2001 | Korhammer et al. |
| 6,282,521 B1 | 8/2001 | Howorka |
| 6,317,728 B1 | 11/2001 | Kane |
| 6,408,282 B1 | 6/2002 | Buist |
| 6,418,419 B1 | 7/2002 | Nieboer et al. |
| 6,421,694 B1 | 7/2002 | Nawaz et al. |
| 6,553,346 B1 | 4/2003 | Walker et al. |
| 6,630,942 B2 | 10/2003 | Gerra et al. |
| 6,691,094 B1 | 2/2004 | Herschkorn |
| 6,766,304 B2 | 7/2004 | Kemp, II et al. |
| 6,772,132 B1 | 8/2004 | Kemp, II et al. |
| 6,938,011 B1 | 8/2005 | Kemp, II et al. |
| 6,966,050 B2 | 11/2005 | Watase et al. |
| 6,983,260 B2 | 1/2006 | Hummelgren |
| 6,996,540 B1 | 2/2006 | May |
| 7,089,205 B1 | 8/2006 | Abernethy |
| 7,127,424 B2 | 10/2006 | Kemp, II et al. |
| 7,146,336 B2 | 12/2006 | Olsen et al. |
| 7,155,410 B1 | 12/2006 | Woodmansey et al. |
| 7,181,425 B1 | 2/2007 | Cha |
| D539,297 S | 3/2007 | Noviello et al. |
| 7,228,289 B2 | 6/2007 | Brumfield et al. |
| 7,243,083 B2 | 7/2007 | Burns et al. |
| 7,246,092 B1 | 7/2007 | Peterson |
| 7,286,063 B2 | 10/2007 | Gauthey et al. |
| 7,305,361 B2 | 12/2007 | Otero et al. |
| 7,356,499 B1 | 4/2008 | Amburn |
| 7,389,264 B2 | 6/2008 | Kemp, II et al. |
| 7,389,268 B1 | 6/2008 | Kemp, II et al. |
| 7,395,506 B2 | 7/2008 | Tan et al. |
| 7,418,422 B2 | 8/2008 | Burns |
| 7,424,450 B2 | 9/2008 | Kemp, II et al. |
| 7,437,325 B2 | 10/2008 | Kemp, II et al. |
| 7,453,443 B2 | 11/2008 | Rytivaara et al. |
| 7,496,535 B2 | 2/2009 | Otero et al. |
| 7,505,932 B2 | 3/2009 | Kemp, II et al. |
| 7,509,276 B2 | 3/2009 | Brumfield et al. |
| 7,512,561 B2 | 3/2009 | Burns |
| 7,523,064 B2 | 4/2009 | Burns et al. |
| 7,542,938 B1 | 6/2009 | Tam |
| 7,542,940 B2 | 6/2009 | Burns et al. |
| 7,565,319 B1 | 7/2009 | Strauss et al. |
| 7,571,134 B1 | 8/2009 | Burns et al. |
| 7,587,356 B2 | 9/2009 | West et al. |
| 7,587,357 B1 | 9/2009 | Buck |
| 7,590,576 B1 | 9/2009 | Zagara et al. |
| 7,590,578 B2 | 9/2009 | Burns et al. |
| 7,590,587 B2 | 9/2009 | Duquette |
| 7,593,887 B2 | 9/2009 | Duquette |
| 7,596,528 B1 | 9/2009 | Herz |
| 7,599,867 B1 | 10/2009 | Monroe et al. |
| 7,599,868 B1 | 10/2009 | Tanpoco |
| 7,599,880 B1 | 10/2009 | Tam |
| 7,610,240 B2 | 10/2009 | Mintz et al. |
| 7,620,587 B2 | 11/2009 | Duquette |
| 7,627,517 B2 | 12/2009 | Badenhorst et al. |
| 7,627,519 B2 | 12/2009 | Burns |
| 7,627,904 B2 | 12/2009 | Tokkonen |
| 7,640,207 B1 | 12/2009 | Tanpoco |
| 7,672,895 B2 | 3/2010 | Mintz et al. |
| 7,676,411 B2 | 3/2010 | Kemp, II et al. |
| 7,693,768 B2 | 4/2010 | Kemp, II et al. |
| 7,702,568 B1 | 4/2010 | Tanpoco |
| 7,702,569 B1 | 4/2010 | Tanpoco |
| 7,707,086 B2 | 4/2010 | Burns et al. |
| 7,725,382 B2 | 5/2010 | Kemp, II et al. |
| 7,774,267 B2 | 8/2010 | Burns et al. |
| 7,805,356 B2 | 9/2010 | O'Connor et al. |
| 7,813,995 B2 | 10/2010 | Burns et al. |
| 7,813,996 B2 | 10/2010 | Kemp, II et al. |
| 7,831,505 B2 | 11/2010 | Herz |
| 7,848,993 B1 | 12/2010 | Buck |
| 7,853,504 B1 | 12/2010 | Zagara et al. |
| 7,853,692 B2 | 12/2010 | Kouda |
| 7,856,392 B1 | 12/2010 | Fishbain |
| 7,861,185 B1 | 12/2010 | Tanpoco |
| 7,870,059 B2 | 1/2011 | Shapiro et al. |
| 7,882,013 B2 | 2/2011 | Shapiro et al. |
| 7,882,014 B2 | 2/2011 | Shapiro et al. |
| 7,882,015 B2 | 2/2011 | Waelbroeck et al. |
| 7,890,414 B2 | 2/2011 | Brumfield et al. |
| 7,904,374 B2 | 3/2011 | Kemp, II et al. |
| 7,921,072 B2 | 4/2011 | Bohannon et al. |
| 8,051,001 B1 | 11/2011 | Mintz et al. |
| 8,095,456 B2 | 1/2012 | Waelbroeck et al. |
| 8,127,274 B2 | 2/2012 | Astheimer |
| 8,145,557 B2 | 3/2012 | Gilbert et al. |
| 8,442,885 B1 | 5/2013 | Carrie et al. |
| 2002/0038279 A1 | 3/2002 | Samuelson et al. |
| 2002/0046146 A1 | 4/2002 | Otero et al. |
| 2002/0046156 A1 | 4/2002 | Horn et al. |
| 2002/0049661 A1 | 4/2002 | Otero et al. |
| 2002/0055899 A1 | 5/2002 | Williams |
| 2002/0069156 A1 | 6/2002 | Adam et al. |
| 2002/0105550 A1 | 8/2002 | Biebesheimer et al. |
| 2002/0120551 A1 | 8/2002 | Jones, III |
| 2002/0128950 A1 | 9/2002 | Wu et al. |
| 2002/0138401 A1 | 9/2002 | Allen et al. |
| 2002/0156718 A1 | 10/2002 | Olsen et al. |
| 2002/0198816 A1 | 12/2002 | Gilbert et al. |
| 2003/0004853 A1 | 1/2003 | Ram et al. |
| 2003/0050800 A1 | 3/2003 | Brandt et al. |
| 2003/0069826 A1 | 4/2003 | Guidi et al. |
| 2003/0093352 A1 | 5/2003 | Muralidhar et al. |
| 2003/0236737 A1 | 12/2003 | Kemp, II et al. |
| 2004/0006528 A1 | 1/2004 | Fung |
| 2004/0117292 A1 | 6/2004 | Brumfield et al. |
| 2004/0210511 A1 | 10/2004 | Waelbroeck |
| 2005/0004852 A1 | 1/2005 | Whitney |
| 2005/0080701 A1 | 4/2005 | Tunney et al. |
| 2005/0165670 A1 | 7/2005 | Woodmansey et al. |
| 2005/0171893 A1 | 8/2005 | Gaer et al. |
| 2005/0203826 A1 | 9/2005 | Farrell et al. |
| 2005/0253817 A1 | 11/2005 | Rytivaara et al. |
| 2005/0256799 A1 | 11/2005 | Warsaw et al. |
| 2006/0010066 A1 | 1/2006 | Rosenthal et al. |
| 2006/0129475 A1 | 6/2006 | Badenhorst et al. |
| 2006/0195389 A1 | 8/2006 | Kemp, II et al. |
| 2006/0229971 A1 | 10/2006 | Kelly |
| 2006/0259382 A1 | 11/2006 | Brumfield et al. |
| 2006/0259384 A1 | 11/2006 | Schluetter et al. |
| 2006/0259404 A1 | 11/2006 | Brumfield et al. |
| 2006/0271475 A1 | 11/2006 | Brumfield et al. |
| 2007/0011081 A1 | 1/2007 | Bok et al. |
| 2007/0038554 A1 | 2/2007 | Kemp, II et al. |
| 2007/0168275 A1 | 7/2007 | Busby et al. |
| 2007/0174173 A1 | 7/2007 | Brucato |
| 2007/0265953 A1 | 11/2007 | Cunningham et al. |
| 2008/0021809 A1 | 1/2008 | Waelbroeck et al. |
| 2008/0133891 A1 | 6/2008 | Salz et al. |
| 2008/0134158 A1 | 6/2008 | Salz et al. |
| 2008/0134170 A1 | 6/2008 | Astheimer |
| 2008/0208732 A1 | 8/2008 | Guttman et al. |
| 2009/0006244 A1 | 1/2009 | Kemp, II et al. |
| 2009/0144186 A1 | 6/2009 | DeBarre |
| 2009/0157501 A1 | 6/2009 | Martel et al. |
| 2009/0228400 A1 | 9/2009 | Burns et al. |
| 2009/0240617 A1 | 9/2009 | Burns et al. |
| 2009/0276353 A1 | 11/2009 | West et al. |
| 2009/0292650 A1 | 11/2009 | Duquette |
| 2009/0292651 A1 | 11/2009 | Duquette |

(56) References Cited

U.S. PATENT DOCUMENTS

| | | | |
|---|---|---|---|
| 2009/0292652 A1 | 11/2009 | Duquette |
| 2009/0319441 A1 | 12/2009 | Duquette |
| 2010/0036766 A1 | 2/2010 | Burns |
| 2010/0070399 A1 | 3/2010 | O'Connor et al. |
| 2010/0138335 A1 | 6/2010 | Kemp, II et al. |
| 2010/0161512 A1 | 6/2010 | Tanpoco |
| 2010/0161821 A1 | 6/2010 | Slamkovic |
| 2010/0235301 A1 | 9/2010 | Tanpoco |
| 2010/0268637 A1 | 10/2010 | Burns |
| 2011/0040668 A1 | 2/2011 | Lee et al. |
| 2011/0040669 A1 | 2/2011 | Lee et al. |
| 2011/0078068 A1 | 3/2011 | Fishbain et al. |
| 2011/0093378 A1 | 4/2011 | Lane et al. |
| 2011/0093379 A1 | 4/2011 | Lane et al. |
| 2011/0208670 A1 | 8/2011 | Joseph et al. |
| 2012/0191588 A1 | 7/2012 | Lidor et al. |

FOREIGN PATENT DOCUMENTS

| | | | |
|---|---|---|---|
| EP | 1067471 A | 1/2001 |
| EP | 1104904 A | 6/2001 |
| EP | 1217564 A2 | 6/2002 |
| EP | 1217564 A3 | 7/2002 |
| EP | 1246111 A2 | 10/2002 |
| EP | 1246111 A3 | 3/2004 |
| JP | 2003532940 A | 11/2003 |
| WO | 91/14231 A1 | 9/1991 |
| WO | 95/26005 A1 | 9/1995 |
| WO | 98/49639 A1 | 11/1998 |
| WO | 99/19821 A1 | 4/1999 |
| WO | 99/30259 A1 | 6/1999 |
| WO | 00/48113 A1 | 8/2000 |
| WO | 00/52619 A1 | 9/2000 |
| WO | 00/62187 A2 | 10/2000 |
| WO | 00/65510 A1 | 11/2000 |
| WO | 01/09757 A1 | 2/2001 |
| WO | 01/16830 A1 | 3/2001 |
| WO | 01/16852 A2 | 3/2001 |
| WO | 01/22266 A2 | 3/2001 |
| WO | 01/22315 A2 | 3/2001 |
| WO | 01/16852 A8 | 6/2001 |
| WO | 01/41280 A1 | 6/2001 |
| WO | 00/61287 A3 | 12/2001 |
| WO | 01/22315 A3 | 1/2002 |
| WO | 02/33621 A1 | 4/2002 |
| WO | 02/33623 A1 | 4/2002 |
| WO | 02/33635 A1 | 4/2002 |
| WO | 02/33636 A1 | 4/2002 |
| WO | 02/33637 A1 | 4/2002 |
| WO | 02/47006 A1 | 6/2002 |
| WO | 02/080433 A2 | 10/2002 |
| WO | 03/077061 A2 | 9/2003 |
| WO | 03/077061 A3 | 4/2004 |
| WO | 2011/049936 A2 | 4/2011 |
| WO | WO 2011/049936 | * 4/2011 |
| WO | 2011/049936 A3 | 11/2012 |

OTHER PUBLICATIONS

Pauer et al.: An Architecural Trade Capability Using the Polemy Kernel, 1996, Proc. of the 1996 IEEE Int. Conference on AScoustics, Speech, and Signal Processing (ICASSP), pp. 1-4.*
Tickit Trading Systems LLC: tickit Automated Trading Strategy Creation, Version 1.1, Nov. 17, 2009, pp. 1-58.*
Trading Technologies: ADL (Algo Design Lab), 2011-2012, pp. 1-2.*
U.S. Appl. No. 10/749,000, filed Dec. 30, 2003, Tanpoco.
"About TickIt Trading Systems LLC" Webpage [online], TickIt Trading Systems LLC, 2010 [Retrieved on Dec. 22. 2010] from the Internet: http://www.tickit.com/about-TickIt.html.
"Algo Design Lab (ADL) Basics" Recorded Webinar [online], TickIt Trading Systems LLC, Feb. 3, 2010. [Retrieved on Dec. 29, 2010] from the Internet: www.tickit.com//files/ADL_Basics_webinar3459.wmv.
"AlgoTrade, LLC Launches to Provide Customized Algorithmic Solutions to the Trading Industry" PRWeb Press Release [online], PRWeb, AlgoTrade, LLC, Apr. 24, 2009. [Retrieved on Jan. 3, 2011] from the Internet: http://www.prweb.com/releases/2009/04/prweb2352714.htm.
"Change in Home Prices" Data Chart [online], New York Times Economix Blog, n.d. [Retrieved on Dec. 16, 2010] from the Internet: http://www.visualizingeconomics.com/wp-content/uploads/chg-home-prices.jpg.
"How to Build an Algorithm" using Apama software Web Video [online], Progress Software and Thomas Reuters, Nov. 23, 2009. [Retrieved on Dec. 2, 2010] from the Internet: http://bft.thomsonreuters.com/2009/11/23/how-to-build-an-algorithm/.
"One-Cancels-Other (OCO) Orders with Algo Design Lab (ADL)" Recorded Webinar [online], TickIt Trading Systems LLC, Feb. 10, 2010. [Retrieved on Dec. 29, 2010] from the Internet: www.tickit.com/files/2-10-OCO_with_ADL.wmv.
"Orc Spreader 5-Minute Dernonstration" Recorded Web Demo [online], Orc Software, n.d. [Retrieved on Dec. 29, 2010] from the Internet: http://www.orcsoftware.com/Resources/Webinar/Orc-Spreader-5-Minute-Demonstration/.
"Patsystems Launches Algo Trading Tool" Press Release [online], Patsystems plc, Nov. 10, 2008. [Retrieved on Dec. 30, 2010] from the Internet: http://www.finextra.com/news/announcement.aspx?pressreleaseid=24461.
"Simulink®—A 'New' Approach to Model Design" Webinar Sereenshot [online], Recorded Webinar: Algorithmic Trading with MATLAB for Financial Applications—2007, The MathWorks, MATLAB® &SIMULINK®, Slide 13, Sep. 25, 2007, [Retrieved on Nov. 8, 2010] from the Internet: http://www.mathworks.com/company/events/webinars/wbnr30376.html?id=30376&p1=50647&p2=50649.
"Summary of Key Points" Webinar Screenshot [online], Recorded Wehinar: Algorithmic Trading with MATLAB for Financial Applications—2007, The MathWorks, MATLAB® &SIMULINK®, Slide 15, Sep. 25, 2007. [Retrieved on Nov. 8, 2010] from the Internet: http://www.mathworks.com/company/events/webinars/wbnr30376.html?id=30376&p1=50647&p2=50649.
"TickIt FAQs" Webpage [online], TickIt Trading Systems LLC, 2010. [Retrieved on Dec. 22, 2010] from the Internet: http://www.tickit.com/faq.html.
"TickIt New Algo Design Lab (ADL) Features Enhancements" Recorded Webinar [online], TickIt Trading Systems LLC, Apr. 14, 2010. [Retrieved on Dec. 29, 2010] from the Internet: http://www.tickit.com/files/2010-04-1415.24TickIt_NewADLFeatures_Enhancements.wmv.
"TickIt Trading Systems | Entrepreneurs in Action" Recorded Web Video [online], Chicago Innovation, YouTube, 2010. [Retrieved on Dec. 29, 2010] from the Internet: http://www.youtube.com/watch?v=plbulcsJtjo.
"TickIt Trading Systems LLC—The Next Generation of Futures Trading" Advertisement, TickIt Trading Systems LLC, CME Magazine, Spring 2010 Issue. Submission Date: May 4, 2010.
"TickIt Trading Systems LLC—The Next Generation of Futures Trading" Advertisement, TickIt Trading Systems LLC, CME Magazine, Winter 2010 Issue. Submission Date: Feb. 16, 2010.
"TickIt Trading Systems" Recorded Web Video [online], Chicago Business, YouTube, 2010. [Retrieved on Dec. 29, 2010] from the Internet: http://www.youtube.com/watch?v=OCzD5BwFKtc&feature=related.
"TradeHelM: Advanced Correlation and Algorithmic Trading Solutions" Brochure, TradeHelm, Inc., 2008, 9 pages.
Actant Website [online], Actant, Inc., n.d. [Retrieved on Dec. 2, 2010] from the Internet: http://www.actant.com/.
Algo Design Lab (ADL) Demo PowerPoint, TickIt Trading Systems LLC, Mar. 24, 2010, 14 pages.
Amp Trading NinjaTrader Webpage [online], Amp Trading, Inc., n.d. [Retrieved on Dec. 2, 2010] from the Internet: http://www.ampfutures.com/ninja_trader.php.
Atwood, J., Video Card Power Consumption Chart Image, Coding Horror: Programming and Human Factors, Aug. 18, 2006, [Retrieved on Dec. 16, 2010]from the Internet: http://www.codinghorror.com/blog/2006/08/video-card-power-consumption.html.

(56) References Cited

OTHER PUBLICATIONS

Bates, J., "Algorithmic Trading Accelerator for Buy-Side and Sell-Side Trading, from Apama" Web Video [online], Progress Software Corporation, n.d. [Retrieved on Dec. 2, 2010] from the Internet: http://web.progress.com/en/apama/algorithmic-trading.html.
Bates, J., "Algorithmic Trading" [online], High Performance Computing Channel on Dr. Dobb's: The World of Software Development, Mar. 9, 2007, pp. 1-6, [Retrieved on Dec. 1, 2010] from the Internet: http:/www.drdobbs.com/high-performance-computing/197801615.
BGC Partners Website [online], BGC Partners, Inc., n.d. [Retrieved on Dec. 2, 2010] from the Internet: http://www.bgcpartners.com/.
Bioteck Gen5TM Microplate Data Analysis Software Image [online], Bioteck Instruments, Inc., n.d. [Retrieved on Dec. 17, 2010] from the Internet http://www.biotek.com/assets/products/149/gen5_screenshot.jpg.
Blue, E.T., "Dataesthetics: The Power and Beauty of Data Visualiation" [online], Eric Blue's Blog, Oct. 4, 2006 [Retrieved on Jun. 21, 2012] from the Internet: http://eric-blue.com/2006/10/04/dataesthetics-the-power-and-beauty-of-data-visualization/.
Broadway Technology Website [online], Broadway Technology, LLC, n.d, [Retrieved on Dec. 2, 2010] from the Internet: http://www.broadwaytechnology.com/.
C.I.A. World FactBook Data Dashboard Image [online], Central Intelligence Agency, n.d. [Retrieved on Dec. 17, 2010] from the Internet: http://www.geois.de/wp-content/uploads/2009/03/picture-199.png.
CME Group "Choosing a Trading Application" Webpage [online], CME Group, n.d. [Retrieved on Dec. 2, 2010] from the Internet: http://www.cmegroup.com/globex/trading-cme-group-products/trading-applications/index.html.
CME Independent Software Vendor Globex Access Directory, CME Group, Dec. 2008, 78 pages.
CQG Spreader Quick Reference Guide [online], CQG, Inc., n.d., 2 pages. [Retrieved on Dec. 3, 2010] from the Internet: http://www.cqg.com/Docs/CQGSpreaderQuckRef.pdf.
CQG Website [online], CQG, Inc., n.d. [Retrieved on Dec. 2, 2010] from the Internet: http://www.cqg.com/.
Crosman, P., "Wall Street Firms Form Enterprise Clouds" [online], Wall Street & Technology, Jun. 16, 2009 [Retrieved on Dec. 30, 2010] from the Internet http://www.wallstreetandtech.com/articles/217801269.
Crovitz, G., "Why Technologists Want Fewer Patents: We Shouldn't Grant Monopolies on Concepts" [online], The Wall Street Journal—Opinion Journal, Jun. 15, 2009 [Retrieved on Dec. 30, 2010] from the Internet: http://online.wsj.com/article/SB124502173891013805.html.
CrunchBase—Aleri Company Webpage [online], CrunchBase, [Retrieved on Dec. 2, 2010] from the Internet: http://www.crunchbase.com/company/aleri.
CTS—Cunningham Trading Systems Webpage [online], Cunningham Trading Systems, n.d. [Retrieved on Dec. 2, 2010] from the Internet: http://www.ctsfutures.com/.
Danforth, N. "Digg Labs—Stack & Swarm Visualization" [online], Simple Complexity—Making Simple Sense of Complex Data, InnovaTech, Inc., Oct. 12, 2007 [Retrieved on Dec. 21, 2010] from the Internet: http://simplecomplexity.net/digg-labs-stack-swarm-visualizations/.
DeCovny, S., "Future Innovations" [online], Banking Technology, Jun. 18, 2009 [Retrieved on Dec. 30, 2010] from the Internet: https://bankingtech.com/bankingtech/future-innovations/20000151145.htm;jsessionid=CFDE244C703F02D45AD98D0D8B5B988D.5fa4e8cc80be35e2653c9f87d8b8be45bf6ba69a.
Edwards, N., "TickIt Intermediate & Advanced Algo Design Lab (ADL) Techniques" Recorded Webinar [online], TickIt Trading Systems LLC, Mar. 10, 2010. [Retrieved on Dec. 29, 2010] from the Internet: http://www.tickit.com/files/2010-03-10_15115_TickIt_Int_and%20Adv_ADL_Techniques.wmv.
Edwards, N., "TickIt Intermediate & Advanced Algo Design Lab (ADL) Techniques" Recorded Webinar [online], TickIt Trading Systems LLC, Mar. 3, 2010, [Retrieved on Dec. 29, 2010] from the Internet: http://www.tickit.com/files/2010-03-03_TickIt_Int_and_Adv_ADL_Techniques2.wmv.
Eigenfactor Data Treemap Visualization [online], well-formed. eigenfactor.org, n.d. [Retrieved on Dec. 20, 2010] from the Internet: http://well-formed.eigenfactor.org/treemap.html.
FFastFill Website [online], FFastFill plc, n.d. [Retrieved on Dec. 2, 2010] from the Internet: http://www.ffastfill.com/.
First Derivatives Website [online], First Derivatives plc, n.d. [Retrieved on Dec. 2, 2010] from the Internet: http://www.firstderivatives,com/pages/home.asp.
FlexTrade Website[online], FlexTrade Systems Inc., n.d. [Retrieved on Dec. 2, 2010] from the Internet: http://www.flextrade.com/.
Focus Trader Pro Demo Screenshot [online], Adadhi Finance and Technology, n.d. [Retrieved on Dec. 2, 2010] from the Internet: http://focus-trader.com/images/client_ws1.png.
Friedman, V., "Data Visualization: Modern Approaches" [online], Smashing Magazine, Smashing Media GmbH, Aug. 2, 2007, [Retrieved on Dec. 20, 2010], from the Internet: http://www.smashingmagazine.com/2007/08/02/data-visualization-modern-approaches/.
Gallagher, J., "How StreamBase will be used by CME Group to Analyze Real-Time Market Data" Web Video [online], StreamBase Systems, Inc., Feb. 17, 2010. Retrieved Dec. 3, 2010 from the Internet: http://www.streambase.com/customers-cme.htm.
Gapminder World Data Chart 2006 Image [online], Gapminder, 2006. [Retrieved on Jan. 5, 2011 ] from the Internet: http://blogoscoped.com/files/gapminderworld-world-chart-large.png.
Google Images Search for "Visual Programming" [online], Google, Inc., n.d. [Retrieved on Dec. 3, 2010 from the Internet: http://www.google.com/images?q=visual+programming&um=1&ie=UTF-8&source=univ&ei=iCPYTLerLcL7lweyk8Mdcq&sa=X&oi=image_result_group&ct=title&resnum=2&ved=0CD4QsAQwAQ&biw=1240&bih=890.
Grant, J., "Algo Technologies Unveils Fastest Share Trading System" [online], Financial Times, Apr. 19, 2010. [Retrieved on Dec. 30, 2010] from the Internet: http://www.ft.com/cms/s/0/bd643216-4bc3-11df-9db6-00144feab49a.html#axzz19cHfG5SJ.
Heires, K., "CQG Adds Puce Capturing and Risk Tools to Futures Trading Platform" [online], Securities Technology Monitor, Sep. 29, 2009. [Retrieved on Dec. 30, 2010] from the Internet: http://www.securitiestechnologymonitor.com/news/-24009-1.html.
Infinity Futures Website [online], Infinity Futures, Inc., n.d. [Retrieved on Dec. 2, 2010] from the Internet: http://www.infinitybrokerage.com/.
Inforalgo Website [online], Inforalgo Information Technology, Ltd., n.d. [Retrieved on Dec. 2, 2010] from the Internet: http://www.inforalgo.com/.
International Search Report of International Appiication No. PCT/US2003/019328, dated Aug. 8, 2003 (mailed Sep. 9, 2003).
International Search Report of International Application No. PCT/US2010/053172, dated Jul. 20, 2011 (mailed Aug. 8, 2011).
Kharouf, I. and Cavaletti, C. "A Trading Room with a View," Futures, vol. 27, Nov. 1998, pp. 66-71.
Kilin Shell Temperature Monitoring System Data Display Image [online], Toshniwal Sensors Pvt. Ltd., n.d. [Retrieved on Dec. 17, 2010] from the Internet: http://www.tsdpl.com/kiln_shell_temperature_monitorin_files/image007.png.
Lane, R., "Algo Design Lab Webinar: Introduction to State Blocks" Recorded Webinar [online], TickIt Trading Systems LLC, Feb. 24, 2010. [Retrieved on Dec. 29, 2010] from the Internet: http://www.tickit.com/files/2010-02-24_TickIt_Int_Adv_ADL_Techniques.wmv.
Last.fm Information Graphics Image [online], LeeByron.com: n.d. [Retrieved on Dec. 17, 2010] from the Internet, http://www.leebyron.com/what/lastfm/.
Lehmann, B. and Modest M., "Trading and Liquidity on the Tokyo Stock Exchange: A Bird's Eye View" [online], The Journal of Finance, The American Finance Association, 1994, vol. 49, No. 3, pp. 951-984. [Retrieved on Jan. 3, 2011] from the Internet: http://www.afajof.org/journal/jstabstract.asp?ref=11451.

(56) References Cited

OTHER PUBLICATIONS

Lengler, R. and Eppler, M., Periodic Table of Visualization Methods [online], visual-literacy.org, n.d. [Retrieved on Dec. 20, 2010] from the Internet: http://www.visual-literacy.org/periodic_table/periodic_table.html.

Lidor, D., "TickIt—Join the Bid with Hedge in Algo Design Lab (ADL)" Recorded Web Video [online], TickIt Trading Systems LLC, YouTube, 2010. [Retrieved on Dec. 29, 2010] from the Internet: http://www.youtube.com/watch?v=vCcbRL4RMng.

Lidor, D., "TickIt—Legger Creation in Algo Design Lab (ADL)" Recorded Web Video [online], TickIt Trading Systems LLC, YouTube, 2010. [Retrieved on Dec. 29, 2010] from the Internet: http://www.youtube.com/watch?v=mAJErRNT_ik.

Lima, M. Visual Complexity Data Project—A Visual Exploration on Mapping Complex Networks [online], VisualComplexity.com, n.d. [Retrieved on Dec. 20, 2010] from the Internet: http://www.visualcomplexity.com/vc/.

ManyEyes Software Data Bubble Chart Image[online], International Business Machines, n.d . [Retrieved on Dec. 17, 2010] from the Internet: http://www-958.ibm.com/software/data/cognos/manyeyes/images/bubble-chart.gif.

MarketsWiki—RTD Tango Information [online], MarketsWiki, n.d. [Retrieved on Dec. 3, 2010] from the Internet: http://www.marketswiki.com/mwiki/RTD_Tango.

Mirus Futures Website [online], Mirus Futures, n.d. [Retrieved on Dec. 2, 2010] from the Internet: http://www.mirusfutures.com/.

MTCBC Stock Data Display Image [online], Merthyr Tydfill County Borough Council—Listed Building Condition Database, n.d. [Retrieved on Dec. 17, 2010] from the Internet: http://www.buildingsatrisk.com/screen9.jpg.

ORC Software Website [online], Orc Software, n.d. [Retrieved on Dec. 2, 2010] from the Internet: http://www.orcsoftware.com/.

Orc Trading Webinars Webpage [online], Orc Software, n.d. [Retrieved on Dec. 29, 2010] from the Internet: http://www.orcsoftware.com/Resources/Webinars/.

Ostrow, A., "16 Awesome Data Visualization Tool" [online], Mashable, May 15, 2007. [Retrieved on Dec. 20, 2010] from the Internet: http://mashable.com/2007/05/15/16-awesome-data-visualization-tools/.

Patsystems "Pro-Mark Front End Trading Solution" Webpage [online], PatSystems plc, n.d. [Retrieved on Dec. 3, 2010] from the Internet: http://www.patsystems.com/tradingSolutions/Front-Ends/proMark.aspx.

Patsystems Website [online], Patsystems Plc, n.d. [Retrieved on Dec. 2, 2010] from the Internet: http://www.patsystems.com/.

Pauer et al., "An Architectual Trade Capability Using the Polemy Kernel", 1996 Proceedings of the 1996 IEEE Int'l. Conference on Acoustics, Speech, and Signal Processing (ICASSP), pp. 1-4.

Progress Software—Apama Product Webpage [online], Progress Software Corporation, n.d. [Retrieved on Dec. 2, 2010] from the Internet: http://web.progress.com/en/apama/index.html.

ProOpticus Website [online], Prime Analytics, LLC, n.d. [Retrieved on Dec. 2010] from the Internet: http://www.primeanalytics.com/index-2.html.

QCTool 11 Window Data Image [online], Science Software, n.d. [Retrieved on Dec. 17, 2010] from the Internet: http://www.sciencesoftware.com/Gallery/qctool11.png.

Rodier, M., "ALGO Technologies Unveils Fastest-Ever Exchange/MTF Matching Engine" [online], Wall Street & Technology: Apr. 19, 2010. [Retrieved on Dec. 30, 2010] from the Internet: http://wallstreetandtech.com/articles/224400686.

RTS "RTD Tango Trader" Product Flyer [online], RTS Realtime Systems AG, n.d., 3 pages, [Retrieved on Dec. 3, 2010] from the Internet: http://www.rtsgroup.net/fileadmin/mediapool/PDF/Download_Center/RTD_Tango_Trader.pdf.

RTS Realtime Systems Website [online], RTS Realtime Systems AG, n.d. [Retrieved on Dec. 2, 2010] from the Internet: http://www.rtsgroup.net/.

RTVS—Range Test Validation System Data Product Image [online], Physical Sciences, Inc., n.d. [Retrieved on Dec. 17, 2010] from the Internet: http://www.psicorp.com/RTVS%20data.GIF.

Schirr, G., "The Front End of Electronic Futures Activity" [online], Futures, Oct. 1, 2005. [Retrieved on Dec. 30, 2010] from the Internet: http://www.allbusiness.com/banking-finance/financial-markets-investing-securities/10576135-1.html.

Simulink Software Web Video [online], The MathWorks, Inc., n.d. [Retrieved on Dec. 2, 2010] from the Internet: http://www.mathworks.com/videos/simulink/getting-started-with-simulink.html;jsessionid=LxfxM4yDK06v2IXT4xcH667DM1GDJMQhFywnrJqPHqDhJG1dnRTF!-2019130019?s_cid=SL_bdyvideo.

Stefaner, M., Elastic Lists Demo: Nobel Prize Winners [online], well-formed-data.net, n.d. [Retrieved on Dec. 17, 2010] from the Internet: http://well-formed-data.net/experiments/elastic_lists/.

Stefaner, M., X by Y Project Data Visualizations [online], Moritz Stefaner Information Aesthetics and Ludwig Boltzmann Institute for media.art.research, n.d. [Retrieved on Dec. 17, 2010] from the Internet: http://moritz.stefaner.eu/projects/x-by-y/.

Steinert-Threlkeld, T., "Algo Certification by Regulators a Non-starter, NYSE Exec Asserts" [online], Security Technology Monitor, Securities Technology Monitor and SourceMedia, Inc., Nov. 8, 2010. [Retrieved on Dec. 30, 2010] from the Internet: http://www.securitiestechnologymonitor.com/news/algo-certification-sec-non-starter-nyse-26365-1.html.

StreamBase FX Aggregation Framework > Sample User Interface Webpage [online], StreamBase System, Inc., n.d. [Retrieved on Dec. 3, 2010] from the Internet: http://www.streambase.com/developers/docs/latest/framework_fx/a_FXAF_Intro_Sample_GUI.html.

Streambase Website [online], StreamBase Systems, Inc., n.d. [Retrieved on Dec. 3, 2010] from the Internet: http://www.streambase.com/.

SunGard Global Trading English-language Website [online], SunGard Global Trading, n.d. [Retrieved on Dec. 2, 2010] from the Internet: http://www.gltrade.com/en/.

TickIt "A Whole New Paradigm in Futures Trading" Brochure, TickIt Trading Systems LLC, FIA Futures & Options Expo, Chicago, IL, Oct. 21-22, 2009.

TickIt "Algo Design Lab (ADL) Overview and Demo" PowerPoint Presentation, TickIt Trading Systems LLC, Mar. 31, 2010, 12 pages.

TickIt "Contact" Webpage [online], TickIt Trading Systems LLC, 2010. [Retrieved on Dec. 22, 2010] from the Internet: http://www.tickit.com/contact.html.

TickIt "News" Webpage [online], TickIt Trading Systems LLC, 2010. [Retrieved on Dec. 22, 2011] from the Internet: http://tickit.com/news.html.

TickIt Algo Design Lab Guide, TickIt Trading Systems LLC, Dec. 29, 2010, Version 1.1, 17 pages.

TickIt Automated Trade Strategy Creation—Algorithm Builder Guide, TickItTrading Systems LLC, Nov. 17, 2009, Version 1.1, 58 pages.

TickIt Quick Guide, TickIt Trading Systems LLC, Nov. 17, 2009, Version 1.1, 46 pages.

TickIt Quick Guide, TickIt Trading Systems LLC, Nov. 3, 2009, Version 1.1, 39 pages.

TickIt Trading Systems Website [online], Tickit Trading Systems LLC, 2010 [Retrieved on Dec. 22, 2010] from the Internet: http://www.tickit.com/.

Tradevec Website [online], TradeVec Limited, n.d. [Retrieved on Dec. 3, 2010] from the Internet: http://www.tradevec.com/.

Trading Screen Website [online], TradingScreen, Inc., n.d. [Retrieved on Dec. 2, 2010] from the Internet: http://www.tradingscreen.com/.

Trading Technologies Website [online], Trading Technologies International, Inc., n.d. [Retrieved on Dec. 2, 2010] from the Internet: http://www.tradingtechnologies.com/.

Trading Technologies International Inc., ADL (Algo Design Lab ), 2011-2012, pp. 1 and 2.

U.S. Appl. No. 11/409,346, Advisory Action mailed Mar. 10, 2009.

U.S. Appl. No. 11/400,346, Final Office Action mailed Dec. 9, 2008.

U.S. Appl. No. 11/409,346, Non-Final Office Action mailed Jun. 25, 2008.

ULLINK Website [online], ULLINK, n.d. [Retrieved on Dec. 2 2010] from the Internet: http://www.ullink.com/.

(56) References Cited

OTHER PUBLICATIONS

USPTO Presentation, NASDAQ, Nov. 8, 2001, 15 pages.

Verena, "Infosthetics: The Beauty of Data Visualiation" [online], pingmag, Yes!Communications, Mar. 23, 2007 [Retrieved on Dec. 20, 2010] from the Internet: http://pingmag.jp/2007/03/23/infosthetics-form-follows-data/.

Vesta 2D Data Display Window Image [online], Koichi Momma, Geocities JP, n.d. [Retrieved on Dec. 17, 2010] from the Internet: http://www.geocities.jp/kmo_mma/crystal/screenshot/vesta/win-2d-display.png.

Virtual Data Display (Dyno Mode) Image [online], ETB Instruments Limited, n.d. [Retrieved on Dec. 16, 2010] from the Internet: http://www.etbinstruments.com/Images/DD_ss_clip_image026.jpg.

Voyage RSS Feed Reader Website [online], rssvoyage.com, n.d. [Retrieved on Dec. 20, 2010] from the Internet: http://rssvoyage.com/.

Wagner, B., "Prodigio: the What, Why and How (Part one)" Wizard Lab Web Video [online], TOS Prodigio Trading Platform and Camatsuo Studio5, Mar. 12, 2010. [Retrieved on Dec. 2, 2010] from the Internet: http://training.prodigiorts.net/wlvideo/wizard_lab100512_final.html.

Wall Street Journal's Technology Innovation Award Application Supporting Documents, TickIt Trading Systems LLC, Submission Date: May 3, 2010, 7 pages.

Wall Street Journal's Technology Innovation Award Application, TickIt Trading Systems LLC, Submission Date: May 3, 2010, 8 pages.

Wang, J., Asymmetric Information and the Bid-Ask Spread: An Empirical Comparison between Automated Order Execution and Open Outcry Auction, Journal of International Financial Markets, Institutions and Money, Apr. 1999, vol. 9, Iss. 2, pp. 115-128.

Wikipedia—LabVIEW Information [online], Wikipedia Foundation, Inc., n.d. [Retrieved on Dec. 3, 2010] from the Internet: http://en.wikipedia.org/wiki/LabVIEW.

William Blair Employee, "Concentrated Stock Positions: Managing Risk and Reward," William Blair and Company, Jun. 2008, pp. 1-16.

World GHG Emissions Data Flow Chart Image [online], World Resources Institute, n.d. [Retrieved on Dec. 17, 2010] from the Internet: http://cait.wri.org/figures/World-FlowChart.jpg.

Written Opinion of Singapore Patent Application No. 201202620-9 by Hungarian Patent Office, dated May 13, 2013 (mailed May 16, 2013).

X_Trader Product HTML Page [online], Trading Technologies International, Inc., Jun. 9, 2000. [Retrieved on Mar. 22, 2001] from the Internet: www.tradingtechnologies.com/products/xtrade_full.html.

Younglai, R. and Spicer, J., "Update 3—US SEC Focused on 'Crazy' Algos After Flash Crash" [online], Reuters, Nov. 8, 2010 [Retrieved on Dec. 30, 2010] from the Internet: http://www.reuters.com/article/idUSN0822188620101108?pageNumber=2.

Extended European Search Report in European Patent Application No. 10775975.5 dated Aug. 5, 2013, mailed Aug. 12, 2013.

\* cited by examiner

BLOCK PLACING TOOL FOR BUILDING A USER-DEFINED ALGORITHM FOR ELECTRONIC TRADING

CROSS REFERENCE TO RELATED APPLICATIONS

The present application is a continuation of U.S. patent application Ser. No. 13/014,547, filed Jan. 26, 2011, now U.S. Pat. No. 8,566,220, and entitled "Block Placing Tool For Building A User-Defined Algorithm For Electronic Trading", the entire contents of which is herewith incorporated by reference into the present application for all purposes.

BACKGROUND

The presently described technology is directed towards electronic trading systems. More particularly, certain embodiments are directed towards a block placing tool for building a user-defined algorithm for electronic trading.

An electronic trading system generally includes a client device in communication with an electronic exchange that may serve as a host for the client device. Typically, the electronic trading system provides for electronically matching orders to buy and sell tradeable objects to be traded. A tradeable object is an item that may be traded. Stocks, options, futures contracts, securities, and commodities are a few examples of tradeable objects.

The electronic exchange transmits market data to the client device. The market data may include, for example, price data, market depth data, last traded quantity data, data related to a market for the tradeable object, and/or combinations thereof. The client device receives market data from the electronic exchange.

In some electronic trading systems, a client device receives and processes market data without displaying the market data on a display device. For example, a "black-box" algorithmic trading system may run automatically and without displaying market data. However, in other electronic trading systems, the client device displays processed market data on a display device. The client device may include software that creates a trading screen. In general, a trading screen enables a user to participate in an electronic trading session. For example, a trading screen may enable a user to view market data, submit a trade order to the electronic exchange, obtain a market quote, monitor a position, and/or combinations thereof.

In some electronic trading systems, the client device sends trade orders to the electronic exchange. However, in other electronic trading systems, other devices, such as server side devices, are responsible for sending the one or more trade orders to the electronic exchange. Upon receiving a trade order, the electronic exchange enters the trade order into an exchange order book and attempts to match quantity of the trade order with quantity of one or more contra-side trade orders. By way of example, a sell order is contra-side to a buy order with the same price. Similarly, a buy order is contra-side to a sell order with the same price. Unmatched quantity of a trade order is held in the exchange order book until quantity of a trade order is matched by the electronic exchange. Unmatched quantity of a trade order may also be removed from the order book when a trade order is cancelled, either by the client device or electronic exchange. Upon matching quantity of the trade order, the electronic exchange may send a confirmation to the client device that the quantity of the trade order was matched.

Electronic exchanges have made it possible for an increasing number of participants to be active in a market at any given time. The increase in the number of potential market participants has advantageously led to, among other things, a more competitive market and greater liquidity. In a competitive environment, like electronic trading, where every second or a fraction of second counts in intercepting trading opportunities, it is desirable to offer tools that help a participant effectively compete in the marketplace or even give an edge over others.

Some current systems include algorithmic trading systems which may allow for quicker evaluation and reaction to changes in market information. However, such systems typically require skilled programmers to develop the trading algorithms, take days (or even months) to test and debug, and the development and debugging process must be repeated when a trader decides on a different approach or desires a modification to the algorithm's logic.

SUMMARY

The embodiments described herein include, but are not limited to, various devices, systems, methods, and computer program products.

Certain embodiments provide a block placing tool for building a user-defined algorithm for electronic trading. Certain embodiments provide for receiving by a block placing tool a selection of one or more blocks. Certain embodiments provide for receiving by a block placing tool a mapping definition including a mapping between block types and/or attributes. Certain embodiments provide for placing blocks based on a selection of blocks and a mapping definition.

Certain embodiments provide a method including receiving by a computing device a selection of blocks, receiving by the computing device a mapping definition, and placing by the computing device at least one new placed block in an algorithm being designed based on the selection of blocks and the mapping definition. The selection of blocks includes at least one block. Each block in the selection of blocks has a block type. The mapping definition includes at least one mapping. Each mapping in the mapping definition specifies a relationship between a first type and a corresponding second type. The first type includes a first block type. The second type includes a second block type.

Certain embodiments provide a computer readable medium having stored therein instructions executable by a processor, wherein the instructions are executable to receive a selection of blocks, receive a mapping definition, and place at least one new placed block in an algorithm being designed based on the selection of blocks and the mapping definition. The selection of blocks includes at least one block. Each block in the selection of blocks has a block type. The mapping definition includes at least one mapping. Each mapping in the mapping definition specifies a relationship between a first type and a corresponding second type. The first type includes a first block type. The second type includes a second block type.

Other embodiments are described below. In addition, modifications may be made to the described embodiments without departing from the spirit or scope of the inventions.

BRIEF DESCRIPTION OF THE DRAWINGS

Example embodiments are described herein with reference to the following drawings.

Figure 1:
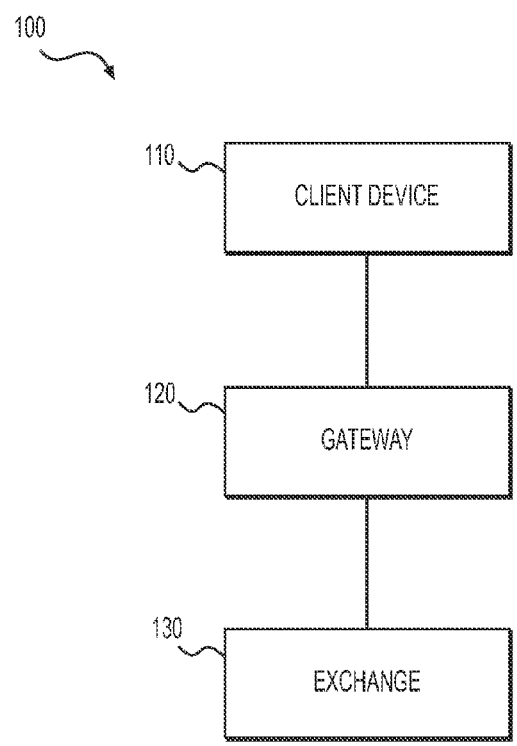
FIG. 1 illustrates a block diagram of an electronic trading system in which certain embodiments may be employed.

The foregoing summary, as well as the following detailed description, will be better understood when read in conjunction with the drawings which show certain embodiments. The drawings are for the purpose of illustrating certain embodiments, but it should be understood that the present inventions are not limited to the arrangements and instrumentality shown in the drawings.

DETAILED DESCRIPTION

I. Example Electronic Trading System

FIG. 1 illustrates a block diagram of an electronic trading system 100 in which certain embodiments may be employed. The system 100 includes a client device 110, a gateway 120, and an electronic exchange 130. The client device 110 is in communication with the gateway 120. The gateway 120 is in communication with the exchange 130.

As used herein, the phrase "in communication with" may include in direct communication and indirect communication through one or more intermediary components.

In operation, the client device 110 may send orders to buy or sell tradeable objects at the exchange 130. For example, a user may utilize the client device 110 to send the orders. The orders are sent through the gateway 120 to the exchange 130. In addition, market data is sent from the exchange 130 through the gateway 120 to the client device 110. The user may also utilize the client device 110 to monitor this market data and base a decision to send an order for a tradeable object on the market data.

A tradeable object is anything which can be traded with a quantity and/or a price. For example, financial products such as stocks, options, bonds, futures, currency, warrants, funds derivatives, securities, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example. For example, while logically represented as a single device, client device 110 may include a trading terminal in communication with a server, where collectively the trading terminal and the server are the client device 110. The trading terminal may provide a trading screen to a user and may communicate commands to the server for further processing of the user's inputs through the trading screen, such as placing orders.

The client device 110 is generally owned, operated, controlled, programmed by, configured by, or otherwise used by a user. As used herein, the phrase "user" may include, but is not limited to, a human (for example, a trader) or an electronic trading device (for example, including a processor and memory or an algorithmic trading system). One or more users may be involved in the ownership, operation, control, programming, configuration, or other use, for example.

The client device 110 may include one or more trading applications. The trading application(s) may, for example, process market data by arranging and displaying the market data in trading and charting windows. The market data may be received from exchange 130, for example. As another example, the market data may be received from a simulation environment that provides live or historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the client device 110. For example, certain components of a trading application may be executed on a trading workstation and other components of the trading application may be executed on a server in communication with the workstation.

The client device 110 may include an electronic trading workstation, a portable trading device, an algorithmic trading system such as a "black box" or "grey box" system, an embedded trading system, and/or an automated trading tool, for example. For example, the client device 110 may be a computing system running a copy of X_TRADER®, an electronic trading platform provided by Trading Technologies International, Inc. of Chicago, Ill. As another example, the client device 110 may be a computing device running an automated trading tool such as Autospreader® and/or Autotrader™, also provided by Trading Technologies International, Inc.

Trading applications may be stored in a computer readable medium of the client device 110. In certain embodiments, certain components of a trading application may be stored on a trading workstation and other components of the trading application may be stored on a server in communication with the workstation. In certain embodiments, one or more components of a trading application may be loaded into the computer readable medium of the client device 110 from another computer readable medium. For example, the trading application (or updates to the trading application) may be stored by a manufacturer, developer, or publisher on one or more CDs or DVDs, which are then provided to someone responsible for loading the application onto the client device 110 or to a server from which the client device 110 retrieves the trading application. As another example, the client device 110 may receive the trading application (or updates to the trading application) from a server, for example, via the Internet or an internal network. The client device 110 may receive the trading application or updates when requested by the client device 110 ("pull distribution") and/or un-requested by the client device 110 ("push distribution").

The client device 110 is adapted to send orders to buy or sell a tradeable object. The client device 110 may also be adapted to cancel orders, change orders, and/or query an exchange, for example. As another example, the client device 110 may be adapted to send orders to a simulated exchange in a simulation environment that does not effectuate real-world trades.

The orders sent by the client device 110 may be sent at the request of a user or automatically, for example. For example, a trader may utilize an electronic trading workstation to place an order for a particular tradeable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, a trading application may include one or more trading screens to enable a trader to interact with one or more markets. Trading screens may enable traders to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130 which, in turn, may be displayed with a user interface of client device 110. Based on the received information, the trading screen may display a range of price levels and corresponding bid and ask quantities for the price levels in regard to tradeable objects. In order to provide the trader with pertinent trading information, the trading screen may display a range of prices (and the corresponding bid and ask quantities) around the inside market. The information may be continuously or regularly provided to the trading application, which allows the trading application to update the trading screen with current market information. A trader may use the trading screen to place buy and sell orders for tradeable objects or to otherwise trade the tradeable objects based on the displayed information, for example.

Trading screens may include, provide, and/or display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, market order windows, and enhancements, features, and/or combinations thereof.

In certain embodiments, the client device 110 includes an algorithmic trading application. For example, the client device 110 may include a black box or grey box trading application. As another example, the client device 110 may include a trading application which algorithmically processes market data but provides a user interface to allow a user to manually place orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

In general, the exchange 130 may be owned, operated, controlled, or used by an exchange entity. Exemplary exchange entities include the CME Group, the London International Financial Futures and Options Exchange ("LIFFE"), the IntercontinentalExchange ("ICE"), and Eurex. The exchange 130 may be an electronic matching system, such as a computer, server, or other computing device, that is adapted to allow tradeable objects, for example, offered for trading by the exchange, to be bought and sold.

The exchange 130 is adapted to match orders to buy and sell tradeable objects. The tradeable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above.

Each gateway may be in communication with one or more different exchanges, for example. Such an arrangement may allow one or more client devices 110 to trade at more than one exchange (and/or provide redundant connections to multiple exchanges), for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, for example. For example, if the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

The components, elements, and/or functionality of the system 100 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer, one or more computing devices, or other processing device.

II. Algo Design Lab

Figure 2A:
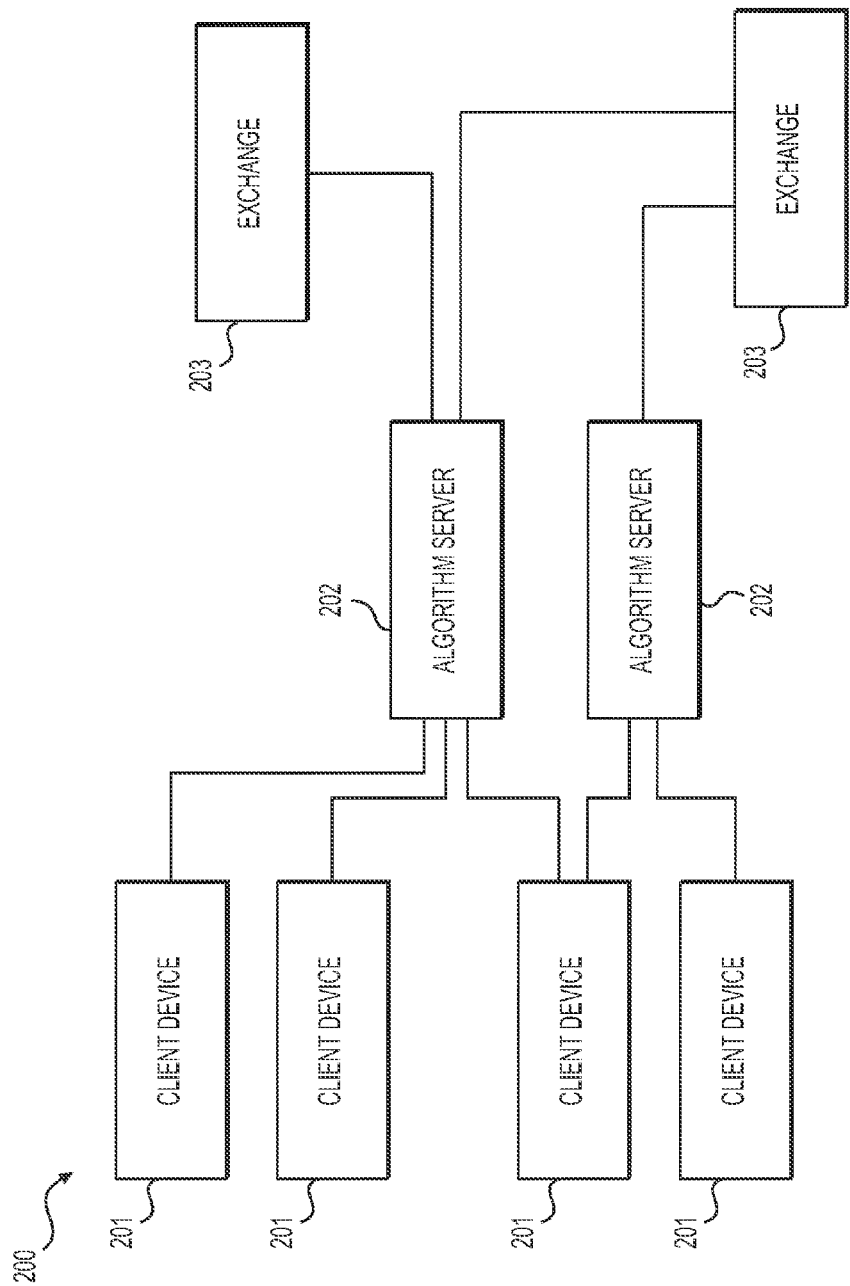
FIG. 2A illustrates a block diagram of an electronic trading system in which certain embodiments may be employed.

FIG. 2A illustrates a block diagram of an electronic trading system 200 in which certain embodiments may be employed. The system 200 includes one or more client devices 201, one or more algorithm servers 202, and one or more electronic exchanges 203. Each client device 201 is in communication one or more algorithm servers 202. Each algorithm server 202 is in communication with one or more exchanges 203. In addition, in certain embodiments, although not shown in FIG. 2A, a client device 201 may also be in communication with one or more exchanges 203. Communication with an exchange by a client device 201 and/or an algorithm server 202 may be done through a gateway similar to the gateway 120, discussed above, for example.

Client device 201 may be similar to client device 110, discussed above, for example. In certain embodiments, the client device 201 may be referred to as a trader terminal. Exchange 203 may be similar to exchange 130, discussed above, for example.

In certain embodiments, the algorithm server 202 is located physically near or at an exchange 203. In certain embodiments, the algorithm server 202 is part of the client device 201.

In operation, an algorithm for electronic trading may be designed on a client device 201. The algorithm may then be communicated to an algorithm server 202. The algorithm server 202 executes the algorithm to perform electronic trading with the exchange 203. Market data may be received by the algorithm server 202 for use by the algorithm. In addition, market data may be received by the client device 201 for use in designing the algorithm. The market data may be received from the exchange 203, for example. As another example, market data may be received from a simulator or from stored/historical data.

Figure 2B:
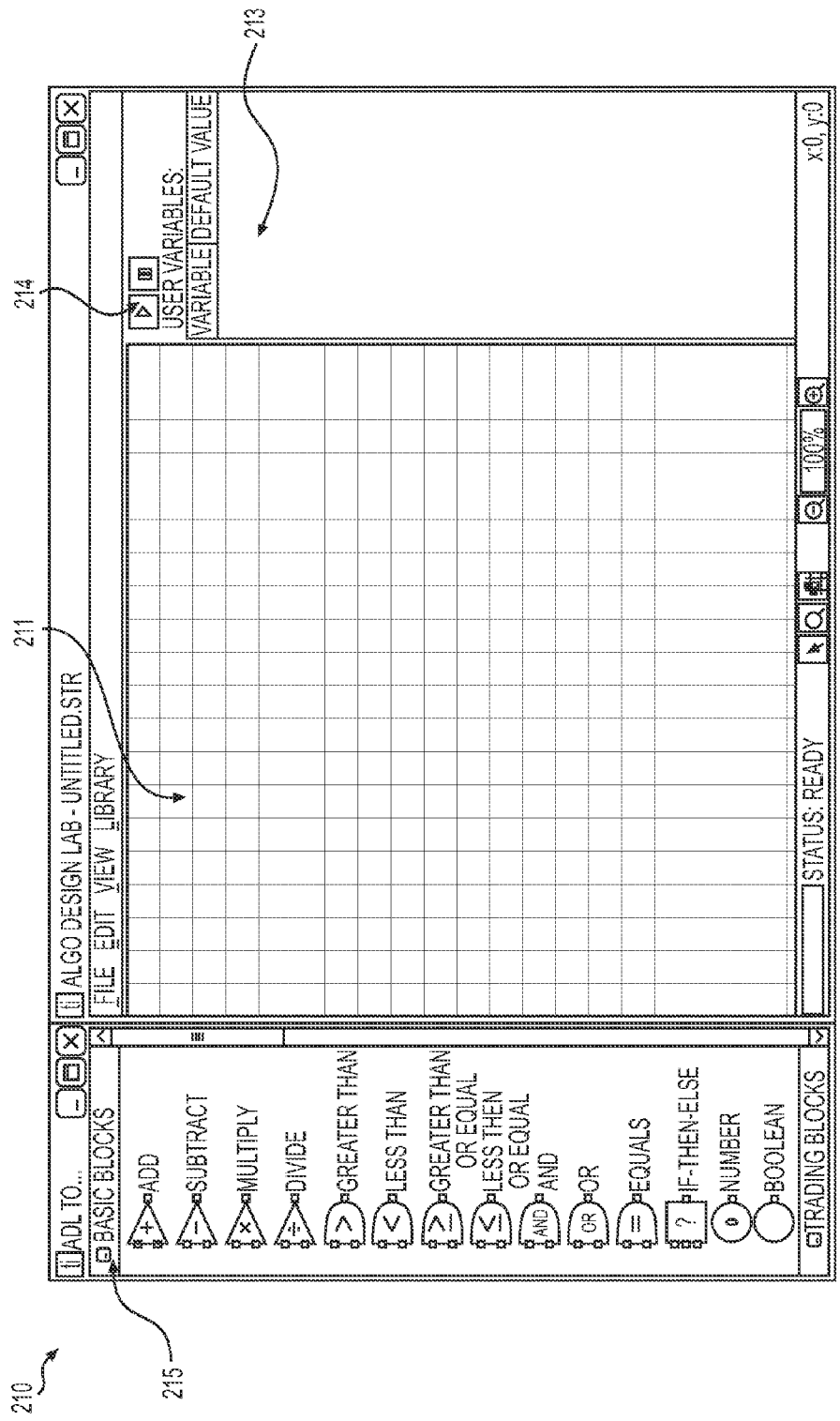
FIG. 2B illustrates a trading interface in which certain embodiments may be employed.

FIG. 2B illustrates a trading interface 210 in which certain embodiments may be employed. The trading interface 210 is a trading interface for an algorithmic trading application referred to as the Algo Design Lab ("ADL"). The ADL allows a trader to design an algorithm for electronic trading. Aspects of the ADL are discussed in U.S. patent application Ser. No. 12/905,709, entitled "User-Defined Algorithm Electronic Trading", filed Oct. 15, 2010, which is herein incorporated by reference in its entirety. It is understood that certain embodiments may be incorporated into trading interfaces other than the ADL.

The trading interface 210 includes a design canvas area 211, a block list area 212, a variable area 213, and a control area 214. In certain embodiments one or more of these areas may be in separate windows or toolbars. For example, the block list area 212 may be in a separate window from the design canvas area 211.

In operation, an algorithm is defined in the design canvas area 211 by utilizing one or more blocks from the block list area 212. Default values for user-defined variables in the algorithm may be specified using the variable area 213. Once the algorithm has been defined, the algorithm may be simulated using controls in the control area 214 to indicate how the logic of the algorithm will behave. An order to be managed according to the defined algorithm may then be initiated using a trading interface.

The design canvas area 211 provides for defining an algorithm. The design canvas area 211 may also be referred to as a whiteboard area. The design canvas area 211 provides a visual programming environment for designing the algorithm. Designing an algorithm includes building, testing, simulating, and/or evaluating the algorithm.

In certain embodiments, the design canvas area 211 is the primary focus of the interface for the trading application 210 and may be a large, white space, for example. In the design canvas area 211, blocks may be arranged according to the preference of the user. In certain embodiments, the design canvas area 211 provides grid lines that may be used to arrange the blocks. In certain embodiments, the design canvas area 211 includes an overview display or map that may be used to navigate through a large algorithm with many blocks. In certain embodiments, the design canvas area 211 may be zoomed in or out so that a user may see more or less of the algorithm at a time.

Blocks are placed in the design canvas area 211 and connected to define the algorithm. The blocks to be placed may be selected from the block list area 212. Once a block has been placed, it may then be connected to other placed blocks.

The block list area 212 includes one or more blocks which may be selected and placed in the design canvas area 211. Blocks represent different functionalities that may be combined according to user preference to build an algorithm.

In general, blocks have inputs and outputs. However, certain blocks may have only inputs and others may have only outputs. For example, a pause block may have only an input. As another example, a number block may have only an output.

Inputs and outputs of blocks are of one of two primary types: continuous or discrete. A continuous type input/output, at any particular point in time (hence continuous) has a value. A discrete type input/output receives/provides discrete events (individual messages/objects) corresponding to specific actions/events that occur at some particular point in time. When a specific action/event occurs, a corresponding discrete event may be generated.

In addition to the primary type of the input/output, an input/output may have a particular value types. For example, a continuous input might have a value type of Boolean, number, integer, floating point number, or instrument. As another example, a block may have two continuous inputs of a variable value type, where the value type for the two inputs may be Boolean or numeric, for example, but must match. An equals block, which takes two inputs and compares them to output a Boolean indicating whether the inputs are equal may have variable inputs so that it may be used to compare Booleans or numbers or instruments, for example. As another example, a discrete output might have a value type of fill confirmation. That is, the discrete output might provide fill confirmation discrete events. As another example, a discrete output might provide more than one type of discrete event for actions such as order request confirmations (indicating an order was placed), fill confirmations (indicating an order was filled or partially filled), order change confirmations (indicating a working order parameters such as price or quantity was changed), order deletion confirmations (indicating a working order was deleted or cancelled), or trade confirmations (indicating a trade has occurred). As another example, a discrete event may be empty in that it indicates only that an event has occurred. An empty discrete event may, for example, be triggered by a timer, a change in a Boolean value, or used to activate a portion of an algorithm at a particular time (such as a time of day or a time when certain market conditions have been met, for example). A discrete event of a particular type may include different information than a discrete event of another type. For example, an order confirmation may include information such as an order identifier and/or an instrument. As another example, a fill confirmation discrete event may include information such as an order identifier, price, quantity, instrument, and/or time of a fill. As another example, an order deletion confirmation may include an order identifier, instrument, and/or time of deletion. As another example, an empty discrete event may not include any information (or may include only a time the event occurred). A discrete event may include user-defined information. For example, a discrete event a fill confirmation for a filled order for instrument A may include user-defined market information such as a bid price in instrument B at the time of the fill in instrument A.

In certain embodiments, a block includes indicators of the primary type for its inputs/outputs. For example, continuous inputs/outputs may be indicated with a particular background color, foreground color, background pattern, border color, border style, shape, symbol, number, text, and/or font and discrete inputs/outputs might be indicated with another color, pattern, border, shape, symbol, number, text, and/or font.

In certain embodiments, a block includes indicators of the value type for its inputs/outputs. For example, inputs/outputs with a particular value type may be indicated with a particular background color, foreground color, background pattern, border color, border style, shape, symbol, number, text, and/or font and inputs/outputs with a different value type may be indicated with another color, pattern, border, shape, symbol, number, text, and/or font.

In certain embodiments, the primary type and/or the value type of an input or output is displayed in a pop-up window when a cursor is positioned near the block. In certain embodiments, information about the configuration of a block is displayed in a pop-up window when a cursor is positioned near the block.

Blocks represent different functionality. In the trading interface 210, blocks have been separated into four general categories of functionality: basic blocks, trading blocks, discrete blocks, and miscellaneous blocks. However, these groupings are for convenient organization and utilization by a user; blocks do not need to be grouped and a block's group does not necessitate particular features. Some blocks may appropriately fit in more than one category and other organizations or groupings of blocks may also be employed.

Basic blocks generally have continuous inputs and outputs and provide arithmetic operations (for example, addition, subtraction, multiplication, and division), logical operations (for example, AND, OR, and comparison such as equality, greater than, and less than), constant values (for example, number and Boolean), and if-then-else constructs. Basic blocks may include add, subtract, multiply, divide, greater than, less than, greater than or equal, less than or equal, AND, OR, equals, IF-THEN-ELSE, number, Boolean, and constant blocks, for example.

Trading blocks generally provide more complex functionality related to manipulating an order (for example, placing an order, modifying an existing order, or deleting an order) or order-related information (for example, a fill confirmation). Trading blocks may have both continuous and discrete inputs and outputs. For example, a market maker block may have continuous inputs for specifying an instrument, price, quantity, and condition for quoting an order and may have a continuous output of the working quantity and a discrete output for providing notification of fills. Trading blocks allow users, including non-programmers (such as traders), to utilize a visual design environment (such as that provided by the ADL) to create and deploy trading algorithms. The trading blocks may allow for more rapid and accurate design of an algorithm as compared to a typical programmer with fewer steps or instructions as compared to other visual programming platforms. Trading blocks may include instrument, instrument attribute, market maker, legger, custom spread, responsive buy/sell, conditional buy/sell, order handler, IF-THEN-ELSE instrument, instrument attribute at price, spread between, trade, order, fill calculator, and fill accumulator blocks, for example.

Discrete blocks generally have discrete inputs and outputs and provide operations based on the occurrence of discrete events. For example, a generator block may generate an occurrence of a discrete event. As another example, a value extractor block may extract a value from a discrete event and make it available as a continuous value to another portion of the algorithm. As another example, a sequencer block may be used to control the sequence in which subsequent blocks are processed in response to a discrete event. Certain discrete blocks may store data to be referenced at a subsequent time. For example, a value accumulator block may receive a discrete event and extract a user-specified value from it. The extracted value may be accumulated with values extracted from each received discrete event. Discrete blocks may include generator, value extractor, value accumulator, value bucket, discrete moving average, state, branch, multiplexer, funnel, sequencer, discrete min, and discrete max blocks, for example.

Miscellaneous blocks provide a variety of functionality that may not necessary fit into the above-discussed categories. For example, these blocks may provide special purpose or more complex calculations or may add additional control to the execution of the algorithm itself. Further, miscellaneous blocks may provide more precise tools to control risk, convert numbers into tradeable values, or use time (either precise or elapsed) as an input or variable. Miscellaneous blocks may include min, max, rounding, display to decimal, not, once true, is number, moving average, conditional f(x), numeric f(x), average, timer, note, random number, square root, log, and pause blocks, for example.

III. Block Placing Tool for Building a User-Defined Algorithm

Certain embodiments provide a block placing tool for building a user-defined algorithm for electronic trading. Certain embodiments provide for receiving by a block placing tool a selection of one or more blocks. Certain embodiments provide for receiving by a block placing tool a mapping definition including a mapping between block types and/or attributes. Certain embodiments provide for placing blocks based on a selection of blocks and a mapping definition.

Figure 3A:
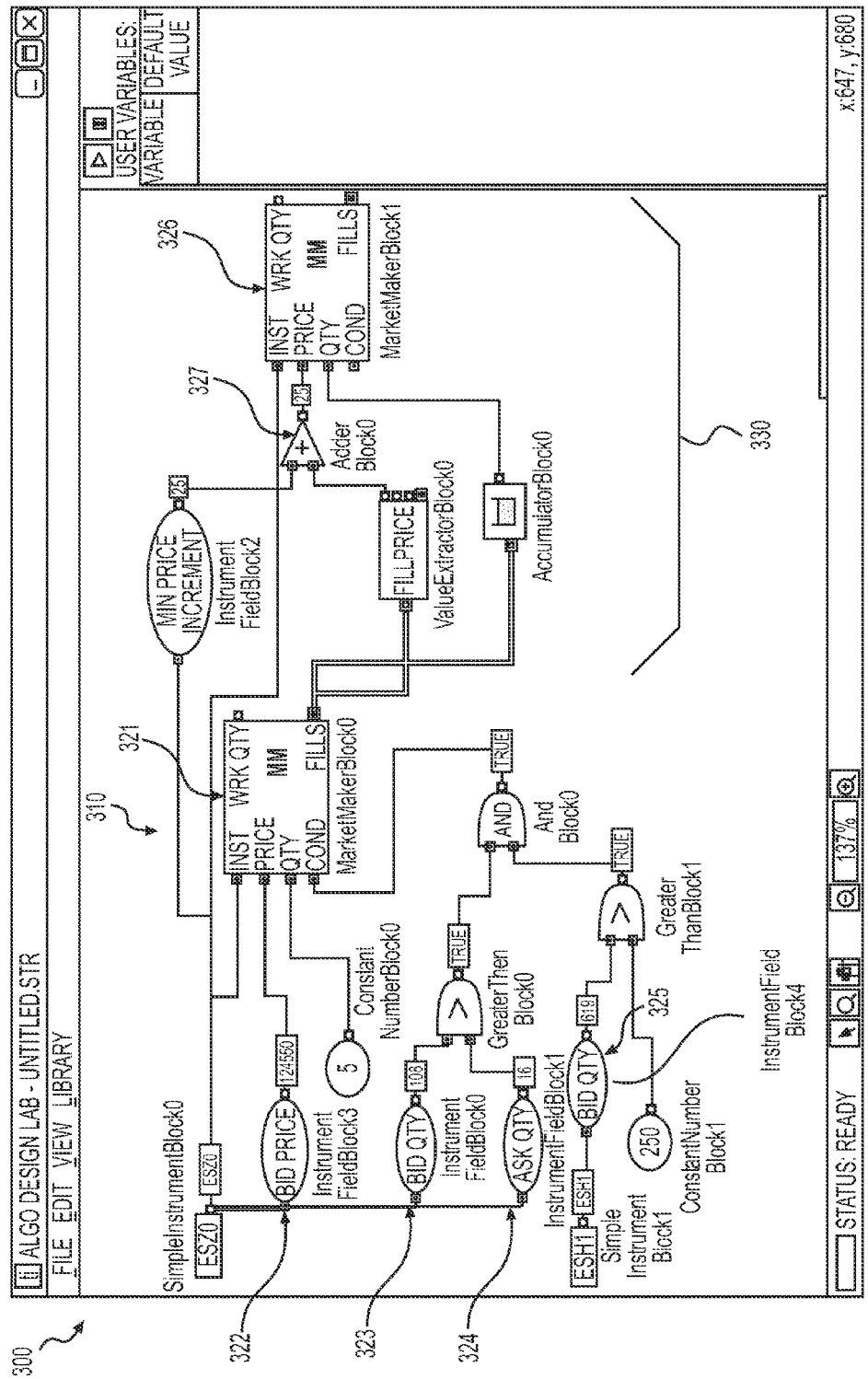
FIGS. 3A-3C illustrate a trading interface according to certain embodiments.
Figure 3B:
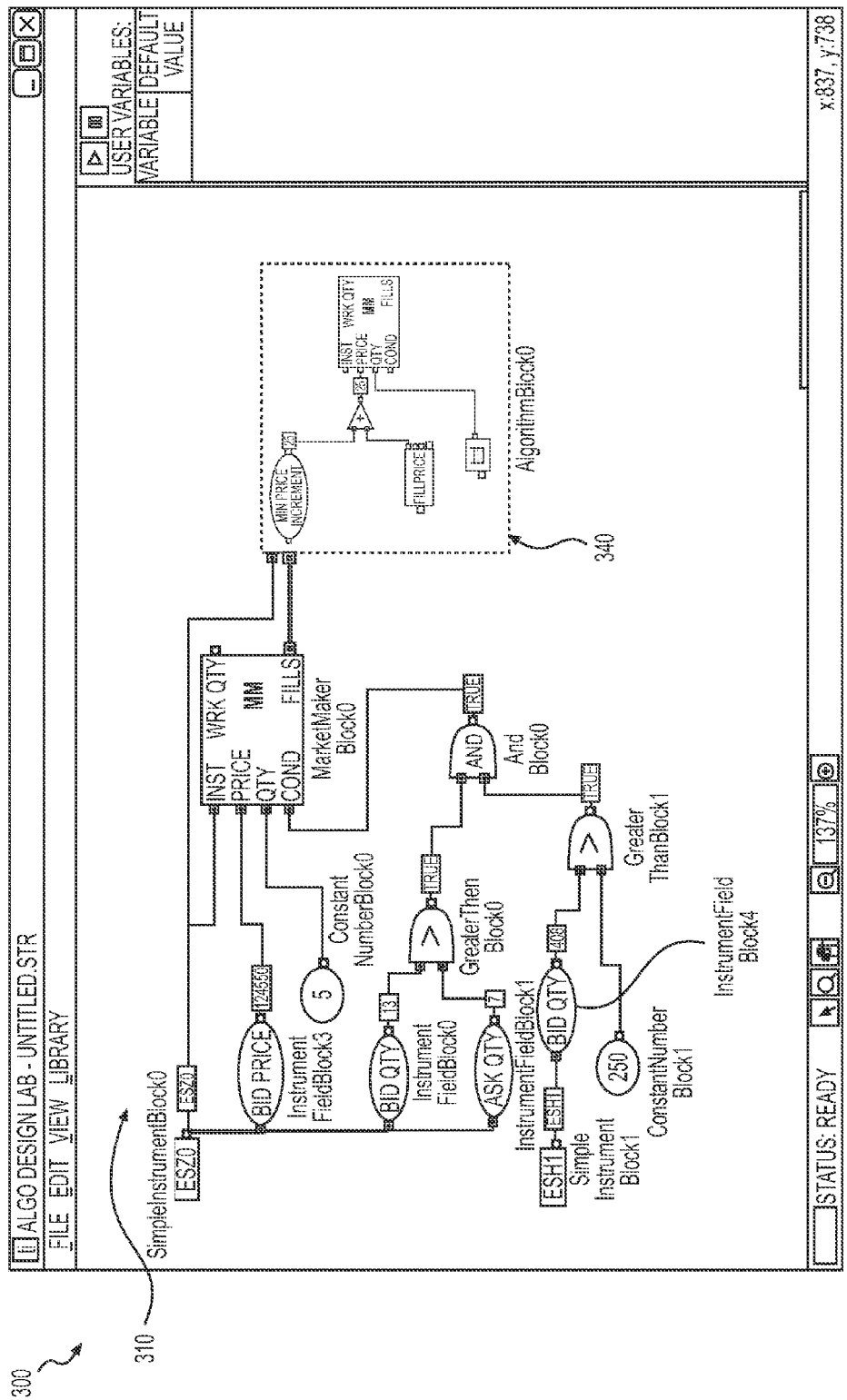
Figure 3C:
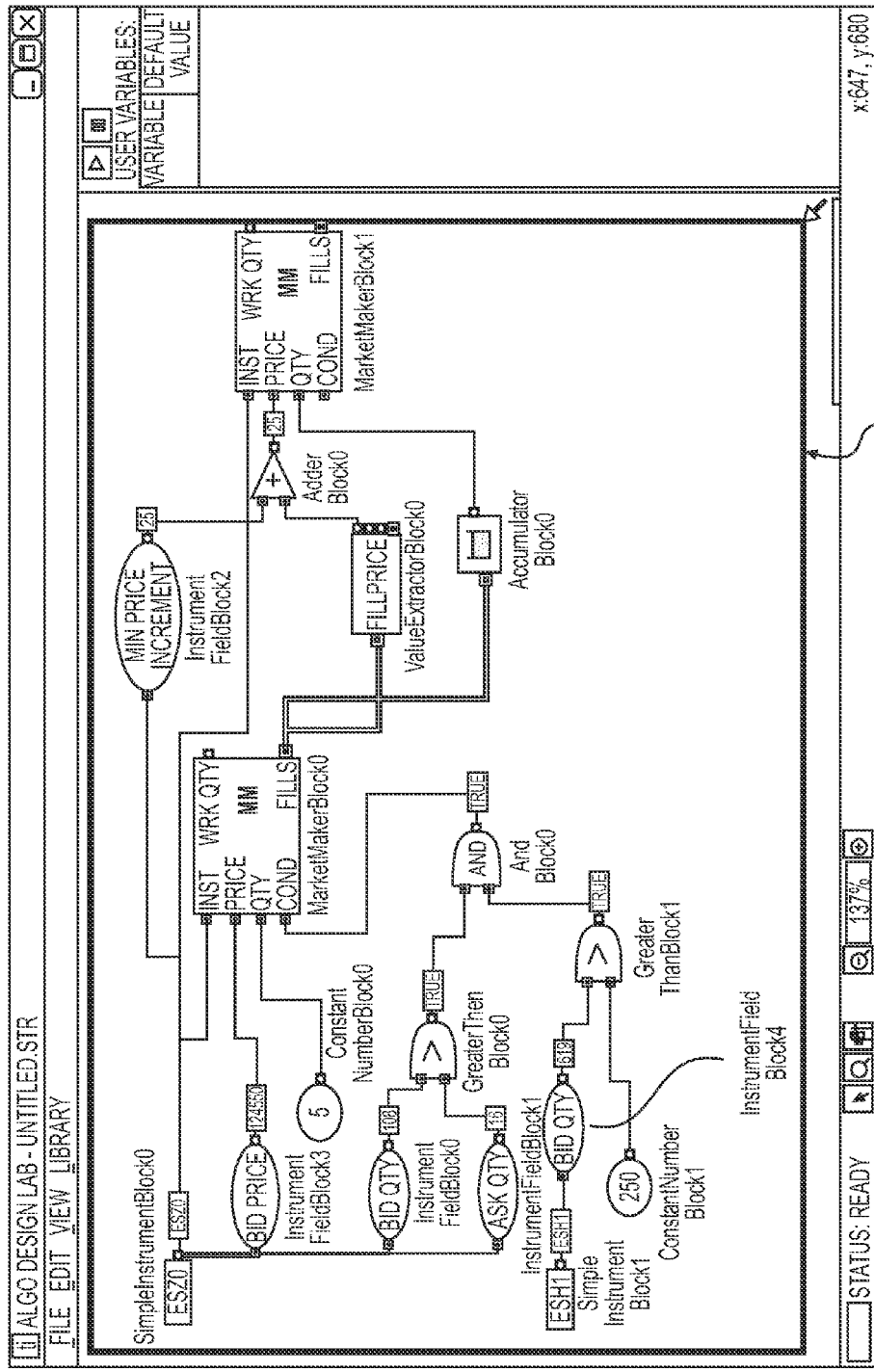

FIGS. 3A-3C illustrate a trading interface 300 according to certain embodiments. The trading interface 300 includes a design canvas area 310 and a plurality of placed blocks 321-327. The trading interface 300 may be similar to the trading interface 210, discussed above, for example. The design canvas area 310 may be similar to the design canvas area 211, discussed above, for example.

As illustrated in FIG. 3A, a definition for a trading algorithm is being designed using the trading interface 300. The illustrated example trading algorithm is a scalping algorithm that will, when certain conditions are met, buy at the best bid price and then attempt to sell at one trading increment above the fill price, typically making a profit of one trading increment per unit bought and sold. Other trading algorithms may be designed using the trading interface 300.

More particularly, the algorithm includes a buy market maker block 321 and a sell market maker block 326. The buy market maker block 321 is a market maker block configured to work buy orders. The buy market maker block 321 is provided with an instrument to buy ("ESZ0") specified by an instrument block. The buy market maker block 321 is provided with a price to buy at specified by an instrument field block 322 which provides the best bid price ("124550") for the instrument. Note that the prices and quantities shown are for a particular instant in time since the market for the instrument may be changing over time. The buy market maker block 321 is provided with a fixed quantity of 5 to buy specified by a number block. The condition input of the buy market maker block 321 is provided a Boolean value determined based on several other blocks ("the condition logic"). The condition logic compares the best bid quantity (provided by the instrument block 323) ("108") for the instrument to determine if it is greater than the best ask quantity (provided by the instrument block 324) ("16"). This result ("TRUE") is then ANDed with a comparison of the best bid quantity (provided by the instrument block 325) ("619") of another instrument ("ESH1") to determine if it is greater than fixed quantity of 250 specified by a number block. The AND block provides the Boolean value for the condition logic ("TRUE") to the condition input of the buy market maker block 321. When the condition input is TRUE, the buy market maker block 321 will work a buy order and when the condition is FALSE, the buy market maker block 321 will remove/refrain from working the buy order. When the buy market maker block 321 receives fill confirmations for the buy order it is working, a discrete event is generated.

The sell market maker block 326 is a market maker block configured to work sell orders. The sell market maker block 326 is part of the covering logic 330. The covering logic 330 will work sell orders to cover positions taken by the buy market maker block 321. The sell market maker block 326 is provided with the same instrument ("ESZ0") to sell. The sell market maker block 326 is provided with a price to sell at specified by an adder block 327 which adds the minimum price increment for the instrument (provided by an instrument field block) ("25") to the fill price (provided by a value extractor block from the discrete event generated by the buy market maker block 321 when a fill confirmation is received). The sell market maker block 326 is provided with a quantity to sell specified by an accumulator block which provides the accumulated quantity that has been bought by the buy market maker block 321, which is extracted from the discrete events generated when fill confirmations are received by the buy market maker block 321.

Thus, when the algorithm is run, the buy market maker block 321 will, when the condition logic indicates to do so, attempt to buy a quantity of 5 at the best bid price (perhaps across multiple buy orders) and sell (perhaps across multiple sell orders) a quantity to match the filled buy quantity at the fill price plus the minimum price increment.

As illustrated in FIG. 3B, the covering logic 330 of the scalping algorithm illustrated in FIG. 3A has been grouped in virtualized group block 340. An instance of a virtualized group block is created for each discrete event that is provided to the virtualized group block. That is, each time a discrete event is received at virtualized group block 340, a new instance of the virtualized group block 340 is created to handle the discrete event. This allows each discrete event be handled by the covering logic 330 based on the information particular to the fill discrete event provided by the buy market marketer block 321.

While the behavior of the scalping algorithm illustrated in FIG. 3B may by preferred by a trader, for clarity the following discussion will address the scalping algorithm as illustrated in FIG. 3A. It should be understood, however, that the block placing tool discussed herein may operate with group blocks, nested group blocks, and/or virtualized blocks.

As discussed above, the algorithm illustrated in FIG. 3A places buy order(s) and, when those buy order(s) are filled, sell order(s) are place to cover them. However, it may be desirable to a trader to have the algorithm include similar logic that, concurrently with the existing logic, places sell order(s) and, when those sell order(s) are filled, buy order(s) are placed to cover them.

A block placing tool is a tool of a trading interface that may be used to place new blocks in the algorithm being designed. The block placing tool places blocks based on a selection of blocks and a mapping of block types and/or attributes.

The block placing tool may be activated through an action such as selecting a menu item or pressing one more keys. For example, an "Import & Reverse" men item may be selected to activate the block placing tool. As another example, a "reverse" option may be selected from a pop-up menu for a selected block to activate the block placing tool. As another example, a key combination such as "Control-R" may be pressed to activate the block placing tool. In certain embodiments, the block placing tool may be accessed using a copy-and-paste-style operation. For example, a "Paste Special" interface may be provided to activate the block placing tool.

The selection of blocks may be determined in a variety of ways. For example, the selected blocks may be determined to be all of the placed blocks. As another example, the selected blocks may be determined to be the placed blocks visible in the design canvas area when the block placing tool is activated. As another example, the selected blocks may be determined based on a user selection. As another example, the selected blocks may be determined based on a defined subset of blocks. All blocks of certain selected and/or pre-defined types may be determined to be the selected blocks, for example. As another example, the selected blocks may be determined to be the blocks in a stored module or library. As another example, the selected blocks may be determined to be one or more blocks on a toolbar. In certain embodiments, one or more of these example techniques for determining the selected blocks are employed.

As illustrated in FIG. 3C, the blocks of the scalping algorithm have been selected by a user using a cursor to draw a box 350 around them. Other user interface techniques may also be used by the user to select the blocks. For example, a user may click using a user input device controlling a cursor in combination with the shift or control key being pressed, for example. The selected blocks may also be determined using other techniques, discussed above, for example.

In certain embodiments, the selection of blocks is determined prior to the activation of the block placing tool. For example, a user may use a cursor to select placed blocks to be used by the block placing tool and then activate the block placing tool with a menu selection. In certain embodiments, the selection of blocks is determined during the activation of the block placing tool. For example, a user may activate the block placing tool with a key combination and the block placing tool may determine the selected blocks to be the blocks visible when activated. In certain embodiments, the selection of blocks is determined after the activation of the block placing tool. For example, the block placing tool may be activated and then lead a user through a series of steps to complete the placement including selecting the blocks to be used by the tool.

A mapping of block types and/or attributes specifies a relationship between a one block type and a second block type. The second block type corresponds to the first block type in the mapping. The first block may be referred to as the source block, the input block, or the original block, for example. The second block may be referred to as the destination block or the output block, for example.

In general, a mapping may be between two related or complementary block types and/or attributes (such as "Adder Block" to "Subtract Block" or an Instrument Field block with a "Best Bid Price" attribute to a "Best Ask Price" attribute). However, such a relationship is not required. A mapping may be between blocks that share common input and output types for inputs and outputs that are connected. For example, an Instrument Field block which includes an attribute specifying the instrument (such as "ESZ0") as well as the particular value (such as "Best Bid Price") may have no inputs and a single numeric output. Such a block may be mapped to a constant number block, which also may have no inputs and a single numeric output, for example.

In certain embodiments, the block type specified in the mapping definition includes an attribute of the block. For example, a mapping definition may include a block type (such as an "Instrument Field" block) which may have one or more particular attributes specified (such as "Bid Price" or "Bid Quantity"). In this case, the particular attribute configured for a block may be viewed as an extension of the block type (such as "Instrument Field-Bid Price"). That is, when referring to the "type" of a block, this may include both the block's actual type and an attribute, for example. There may be one or more "levels" of attributes (such as "Instrument Field-Bid Price-USD", which may be an Instrument Field block that provides the best bid price in U.S. dollars) that may provide levels of specificity with respect to the block type, for example. In certain embodiments, the mapping may include entries for both the first block type and an optional entry for an attribute of the first block. Similarly, the mapping may include entries for the second block type and an attribute of the second block.

The mapping of block types and/or attributes may be defined in a variety of ways. For example, the mapping definition may be user-specified. As another example, the mapping definition may be determined each time the block placing tool is activated. As another example, the mapping definition may be pre-defined based on a user preference. As another example, the mapping definition may be pre-defined by a trading application. As another example, the mapping definition may be hard coded. As another example, the mapping definition may be determined based on the selection of blocks. As another example, the mapping definition may be determined heuristically by the trading interface based on the selection of blocks, visible blocks, and/or blocks being used in the algorithm. In certain embodiments, one or more of these example techniques for determining the mapping definition are employed.

In certain embodiments, the mapping definition is determined prior to the activation of the block placing tool. For example, a trading application may include pre-defined mappings (either hard coded or that a user may modify) that have been configured before the user activates the block placing tool with a menu selection and that are used for each activation of the block placing tool. In certain embodiments, the mapping definition is determined during the activation of the block placing tool. For example, a user may activate the block placing tool with a key combination and the block placing tool may determine the mapping definition heuristically based on the blocks visible when activated. In certain embodiments, the mapping definition is determined after the activation of the block placing tool. For example, the block placing tool may be activated and then lead a user through a series of steps to complete the placement including determining the mapping definition to be used by the tool. As another example, the block placing tool may be activated by initiating a "Paste Special" command as part of a copy-and-paste-style operation in the trading interface and an interface for determining the mapping definition may then be provided prior to the block placing tool placing the new blocks.

FIGS. 4A-4F illustrate an interface 400 for specifying a mapping definition according to certain embodiments.

Figure 4A:
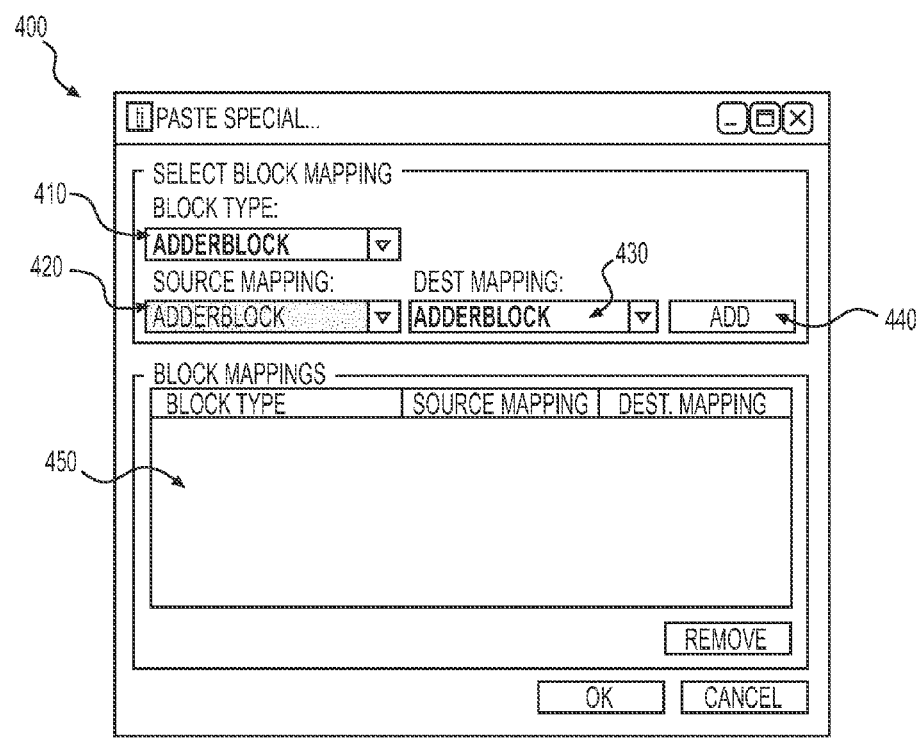
FIGS. 4A-4F illustrate an interface for specifying a mapping definition according to certain embodiments.

As illustrated in FIG. 4A, the interface 400 includes a block type interface 410, a source mapping interface 420, a destination mapping interface 430, an add button 440, and a block mapping region 450.

In operation, the interface 400 allows a user to specify a mapping definition for use with a block placement tool. A block type is selected from the block type interface 410. Depending on the particular block type selected, the source mapping interface 420 and/or the destination mapping interface 430 may be enabled to specify the mapping of block types and/or attributes. Once the source and/or destination mappings have been specified (if needed), the specified mapping may be added to the mapping definition. The block mapping region 450 displays the mappings included in the mapping definition.

Figure 4B:
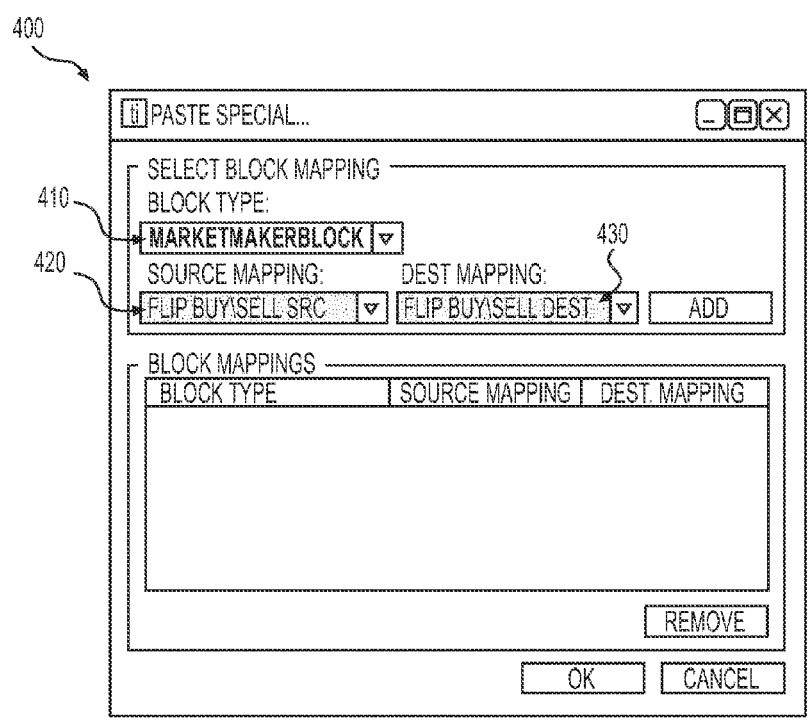

As illustrated in FIG. 4B, the block type interface 410 indicates that the "MarketMakerBlock" block type has been selected. The source mapping interface 420 and the destination mapping interface 430 have been grayed out because the mapping for a market maker block is pre-defined to be flipping (or replacing) a buy market maker block to a sell market maker block and a sell market maker block to a buy market maker block.

Figure 4C:
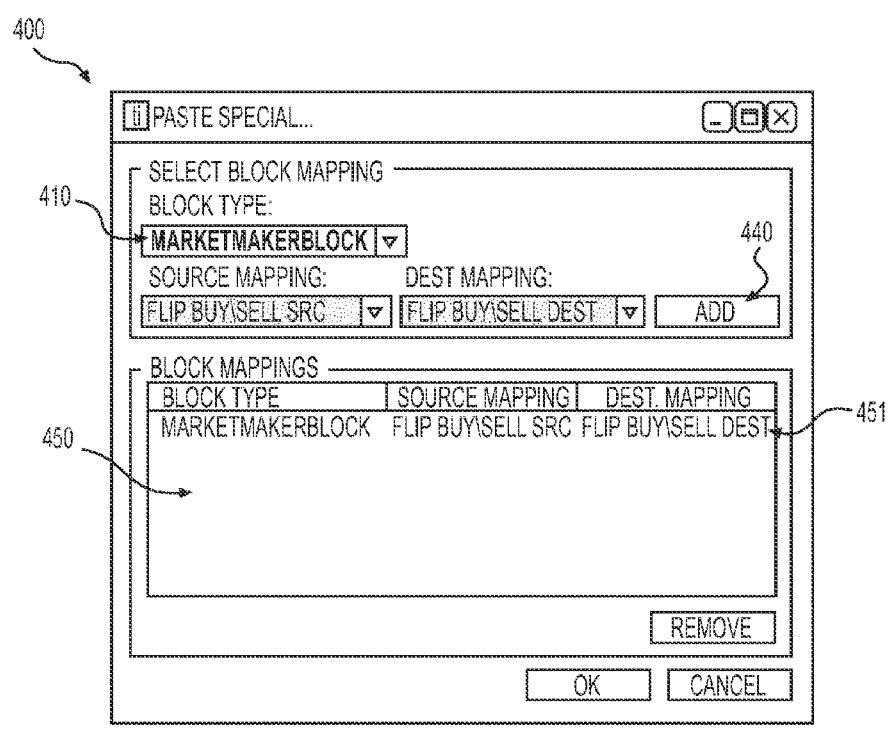

As illustrated in FIG. 4C, when the add button 440 is pressed subsequent to the selection discussed above in reference to FIG. 4B, the mapping is added to the mapping definition and shown in the block mapping region 450 as mapping 451.

Figure 4D:
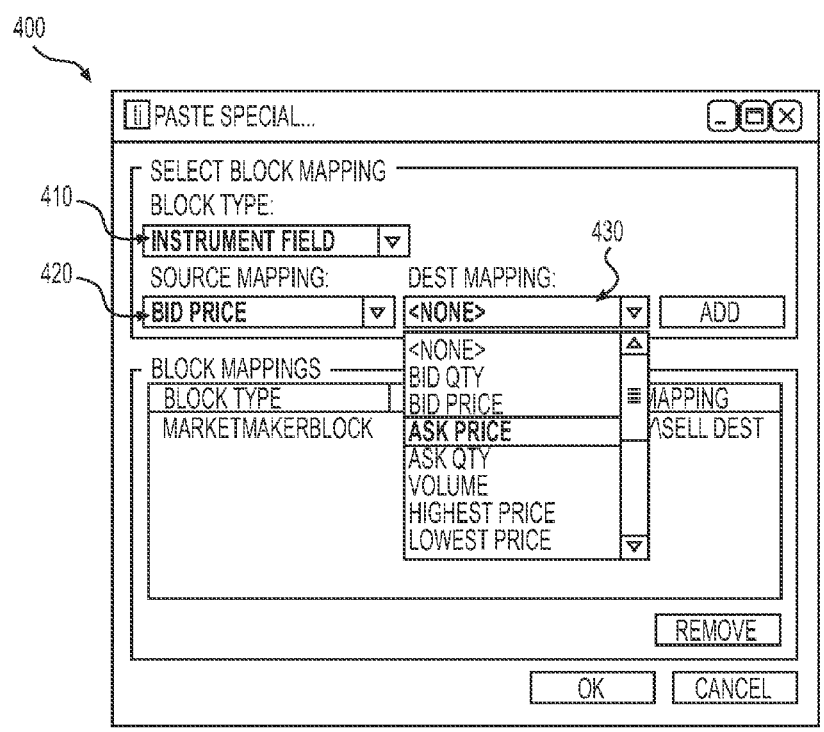

As illustrated in FIG. 4D, the block type interface 410 indicates that the "Instrument Field" block type has been selected. The source mapping interface 420 and the destination mapping interface 430 are activated to allow selection of the source and destination attributes for the instrument field block to be specified in the mapping definition. As illustrated, the source mapping has been selected to be the "Bid Price" attribute and the destination mapping is being selected as the "Ask Price" attribute. Thus, the mapping to be added to the mapping definition is that an instrument field block with an attribute of "Bid Price" will be mapped to an instrument field block with an attribute of "Ask Price."

Figure 4E:
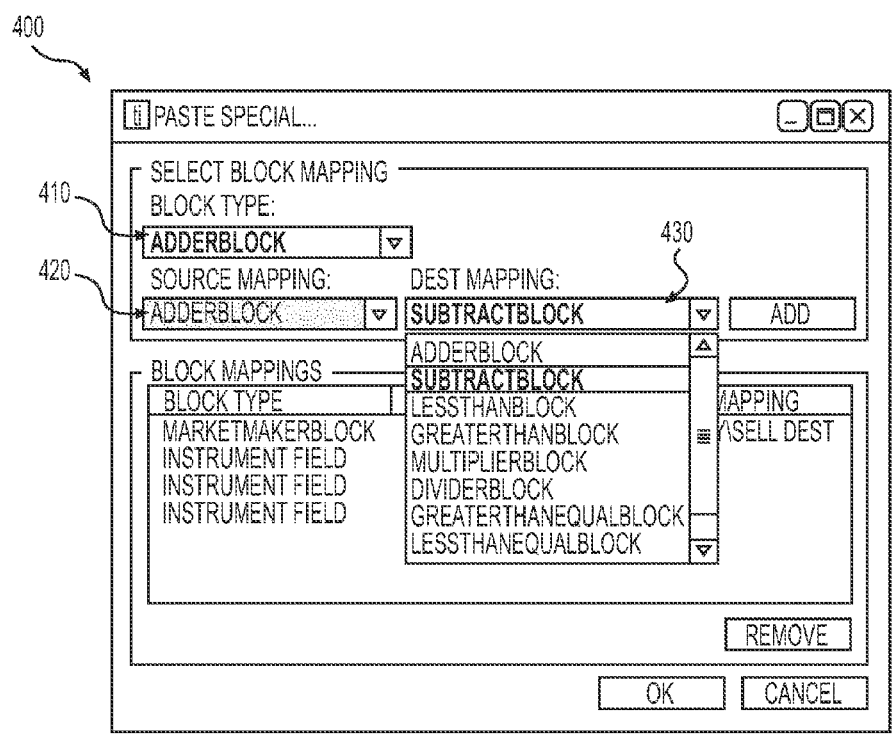

As illustrated FIG. 4E, the block type interface 410 indicates that the "AdderBlock" block type has been selected. The source mapping interface 420 is grayed out because it is not needed for this block type. The destination mapping interface 430 is activated to allow selection of the destination block type to be specified in the mapping definition. As illustrated, the destination mapping is being selected to be the "SubtractBlock" block type. Thus, the mapping to be added to the mapping definition is that an "AdderBlock" will be mapped to a "SubtractBlock."

Figure 4F:
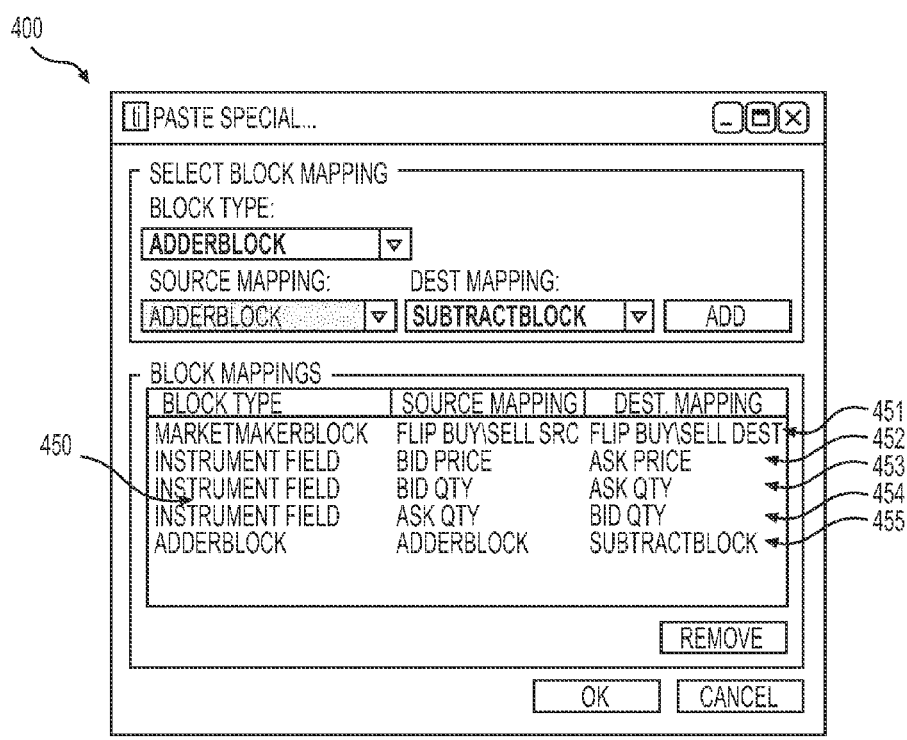

As illustrated in FIG. 4F, the block mapping region 450 shows each of the mappings specified for the mapping definition. More particularly, the mapping definition includes mappings 451-455. As discussed above, mapping 451 represents a mapping for a market maker block where the buy/sell setting of a market maker block is flipped to be sell/buy. Mapping 452 represents a mapping for an instrument field block with a "Bid Price" attribute being mapped to an instrument field block with an "Ask Price" attribute. Mapping 453 represents a mapping for an instrument field block with a "Bid Quantity" attribute being mapped to an instrument field block with an "Ask Quantity" attribute. Mapping 454 represents a mapping for an instrument field block with an "Ask Quantity" attribute being mapped to an instrument field block with a "Bid Quantity" attribute. Mapping 455 represents a mapping of an "AdderBlock" to a "SubtractBlock."

Once the block placing tool has been activated and the selection of the blocks and the mapping definition have each been determined, the block placing tool may place new blocks in the algorithm based on the selection of blocks and the mapping definition.

In certain embodiments, the new blocks placed by the block placing tool are placed into a new group block. For example, a user may select an option for the block placing tool to place the new blocks into a new group block in the algorithm.

In certain embodiments, the block placing tool determines the new blocks and, rather than placing the new blocks in the algorithm, performs another action. For example, the block placing tool may create a new module or library containing the determined new blocks. As another example, the block placing tool may put the determined new blocks into a clipboard so that a user may place the determined new blocks into the algorithm through a "paste" operation.

Figure 5:
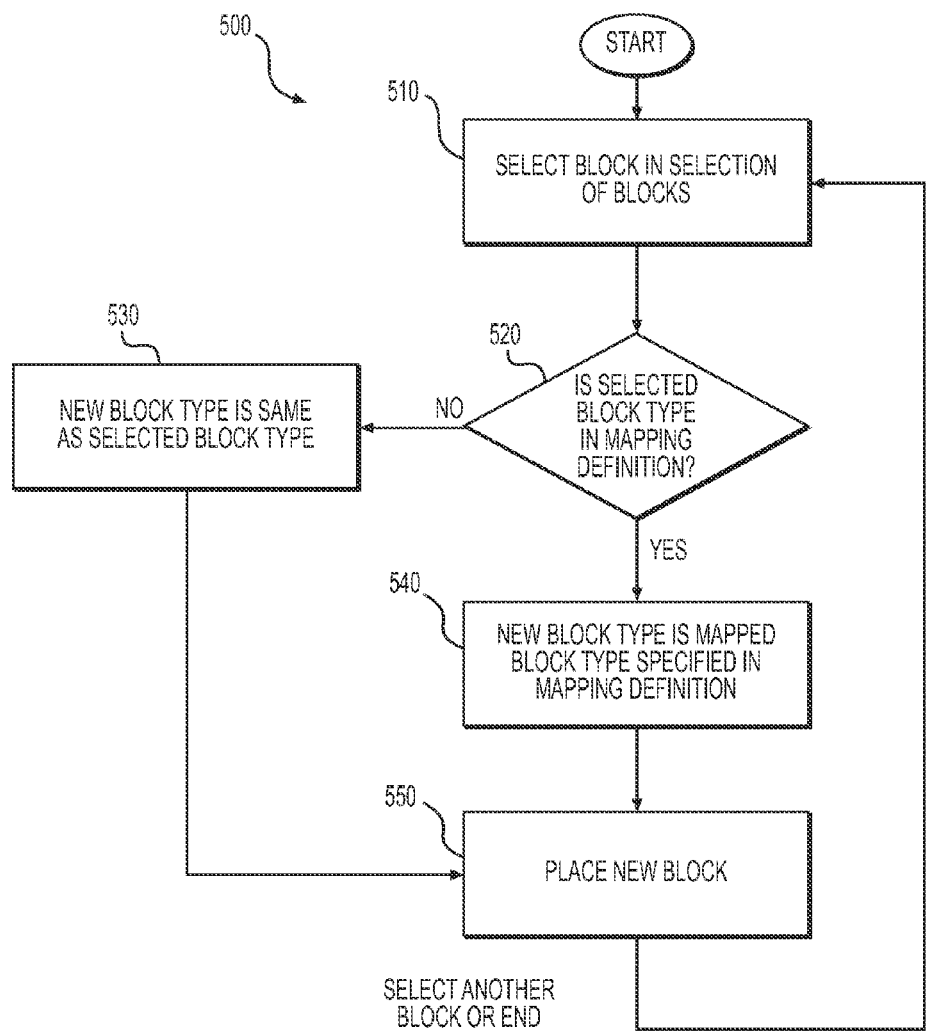
FIG. 5 illustrates a flowchart of a method according to certain embodiments.

FIG. 5 illustrates a flowchart 500 of a method according to certain embodiments. Some or all of the method illustrated in the flowchart 500 may be performed by a block placing tool to place new blocks, for example. The method is described with reference to elements of systems discussed above, but it should be understood that other implementations are possible. The flowchart 500 for the method begins at block 510.

At block 510, a selected block is selected from the selection of blocks. The selection of blocks is the selection of blocks determined as discussed above. In general, the selected block may be a block in the selection of blocks that has not previously been selected as the selected block. For example, the selected block may be determined using an iterator that traverses the blocks in the selection of blocks. As discussed above, the selection of blocks may include blocks such as group blocks, nested group blocks, and/or virtualized blocks. In such a case, the method may recurse through the group blocks or otherwise iterate through them, for example. The method then proceeds to block 520.

At block 520, the selected block is evaluated to determine if the type of the selected block is specified in the mapping definition. The selected block is the block selected in block 510, discussed above. The mapping definition is the mapping definition determined as discussed above.

Determining if the type of the selected block is specified in the mapping definition may includes evaluating, where appropriate, if an attribute of the selected block is specified in the mapping definition. For example, a mapping definition may include a block type (such as an "Instrument Field" block) which may have one or more particular attributes specified (such as "Bid Price" or "Bid Quantity"). In this case, the particular attribute configured for a block may be viewed as an extension of the block type (such as "Instrument Field-Bid Price") for the purpose of determining if the type of the selected block is specified in the mapping definition.

In certain embodiments, the evaluation of the attribute may be made as a separate evaluation. In the embodiment illustrated in FIG. 5, the evaluation of the type of the selected block includes both the type of the selected block and, where appropriate, its attributes.

If the type of the selected block is not specified in the mapping definition, the method proceeds to block 530. For example, assuming the mapping definition is similar to the mapping definition shown in FIG. 4F, if the selected block is a "GreaterThanBlock" (which is not in the mapping definition), then it is desirable that the block placing tool place a new "GreaterThanBlock" into the algorithm. If the type of the selected block is specified in the mapping definition, the method proceeds to block 540. For example, assuming the mapping definition is similar to the mapping definition shown in FIG. 4F, if the selected block is an "AdderBlock" (which is specified in mapping 455), then it is desirable that the block placing tool place a new "SubtractBlock" into the algorithm.

At block 530, the type of the new block is determined to be the same as the type of the selected block. The method then proceeds to block 550.

At block 540, the type of the new block is determined to be the mapped block type specified in the mapping definition. The method then proceeds to block 550.

At block 550, the new block is placed. The type of then new block is the type determined in block 530 or block 540, as appropriate. Once the new block is placed, the method proceeds to block 510 to select another block or ends if no other block should be selected. For example, the method may end if each block in the selected blocks has been traversed.

One or more of the blocks of the flow chart 500 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer, one or more computing devices, or other processing device.

Certain embodiments may omit one or more of these blocks and/or perform the blocks in a different order than the order listed. For example, some blocks may not be performed in certain embodiments. As a further example, certain blocks may be performed in a different temporal order, including simultaneously, than listed above.

Figure 6A:
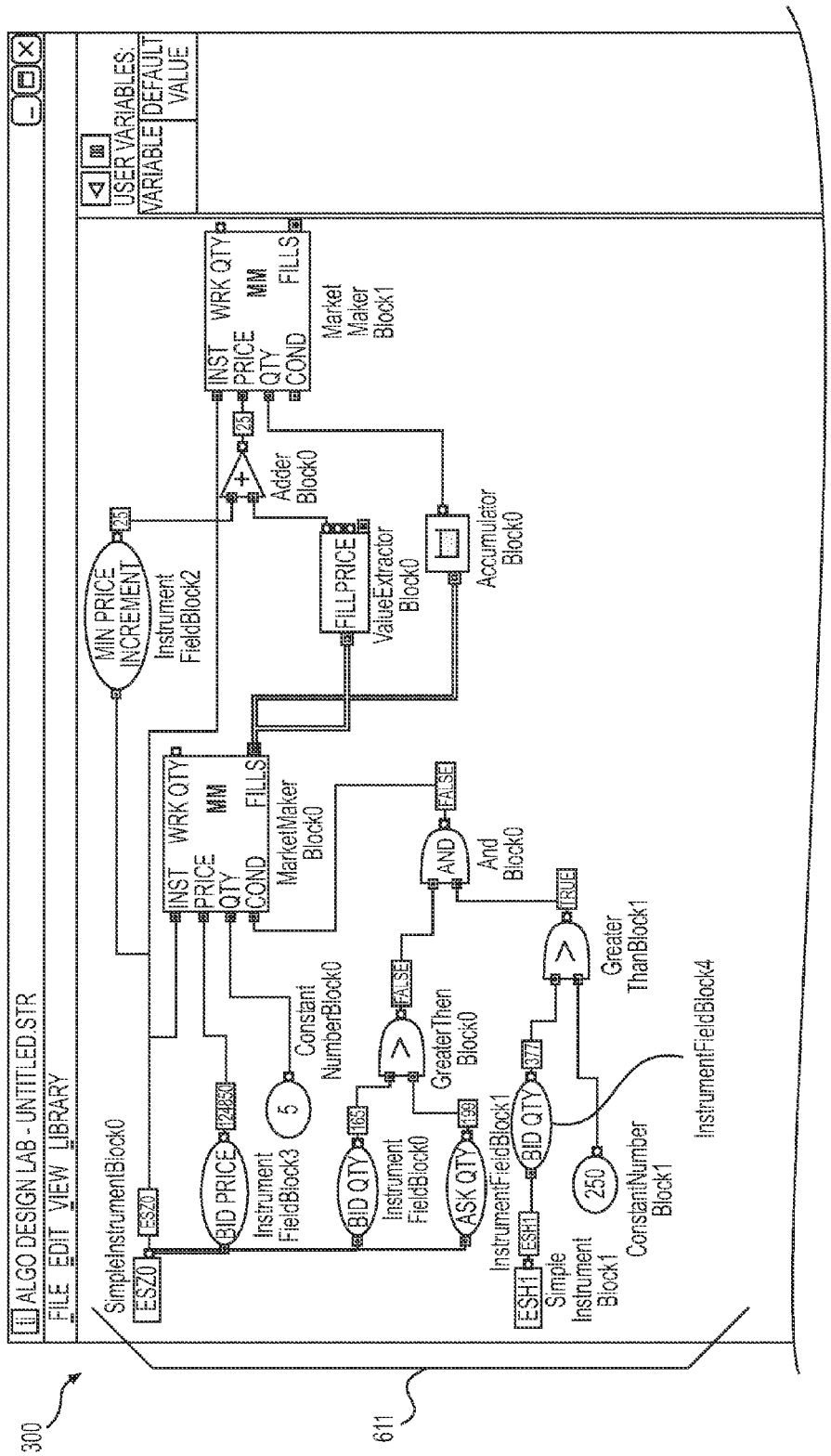
FIGS. 6A-6B illustrate a trading interface according to certain embodiments.
Figure 6A:
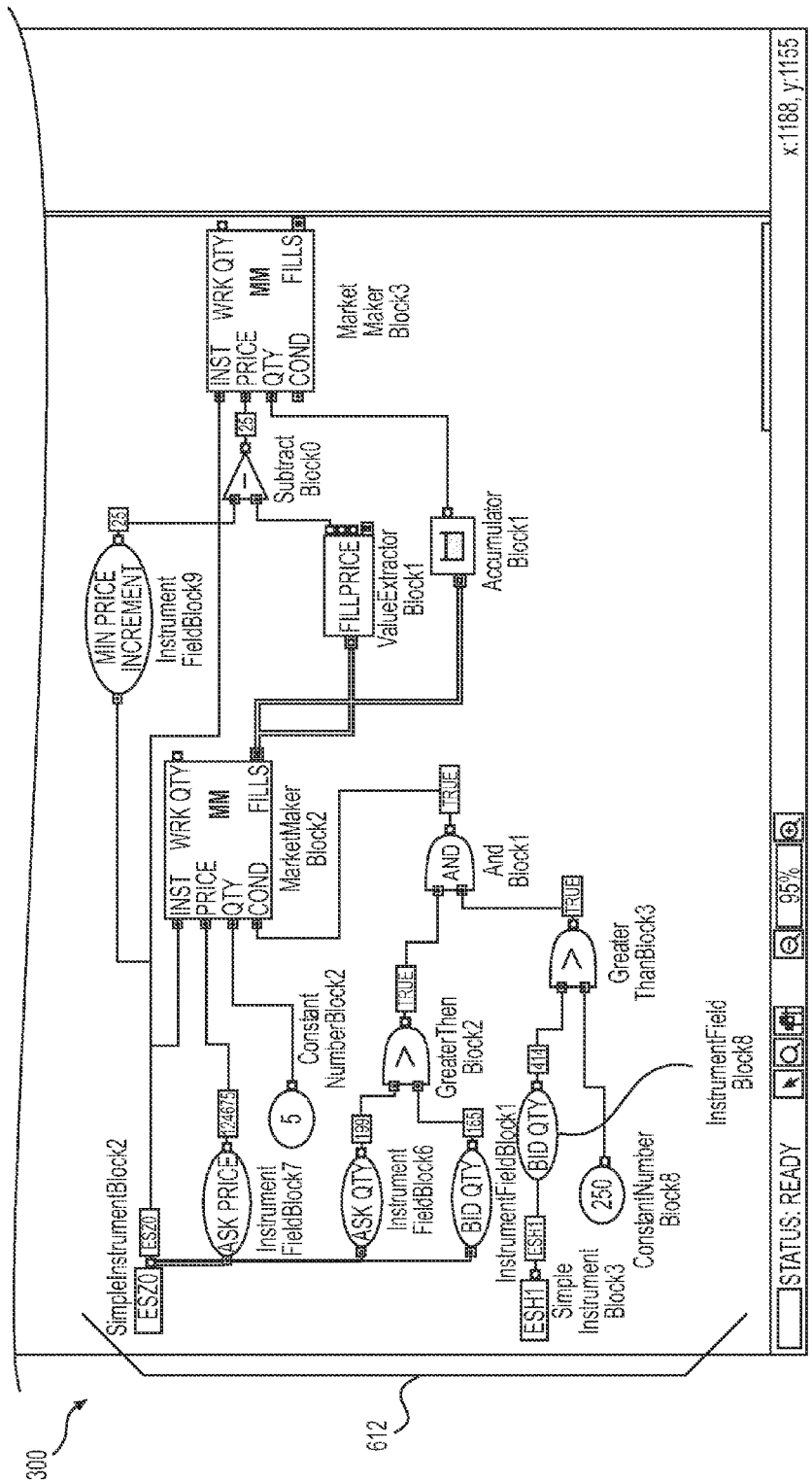
Figure 6B:
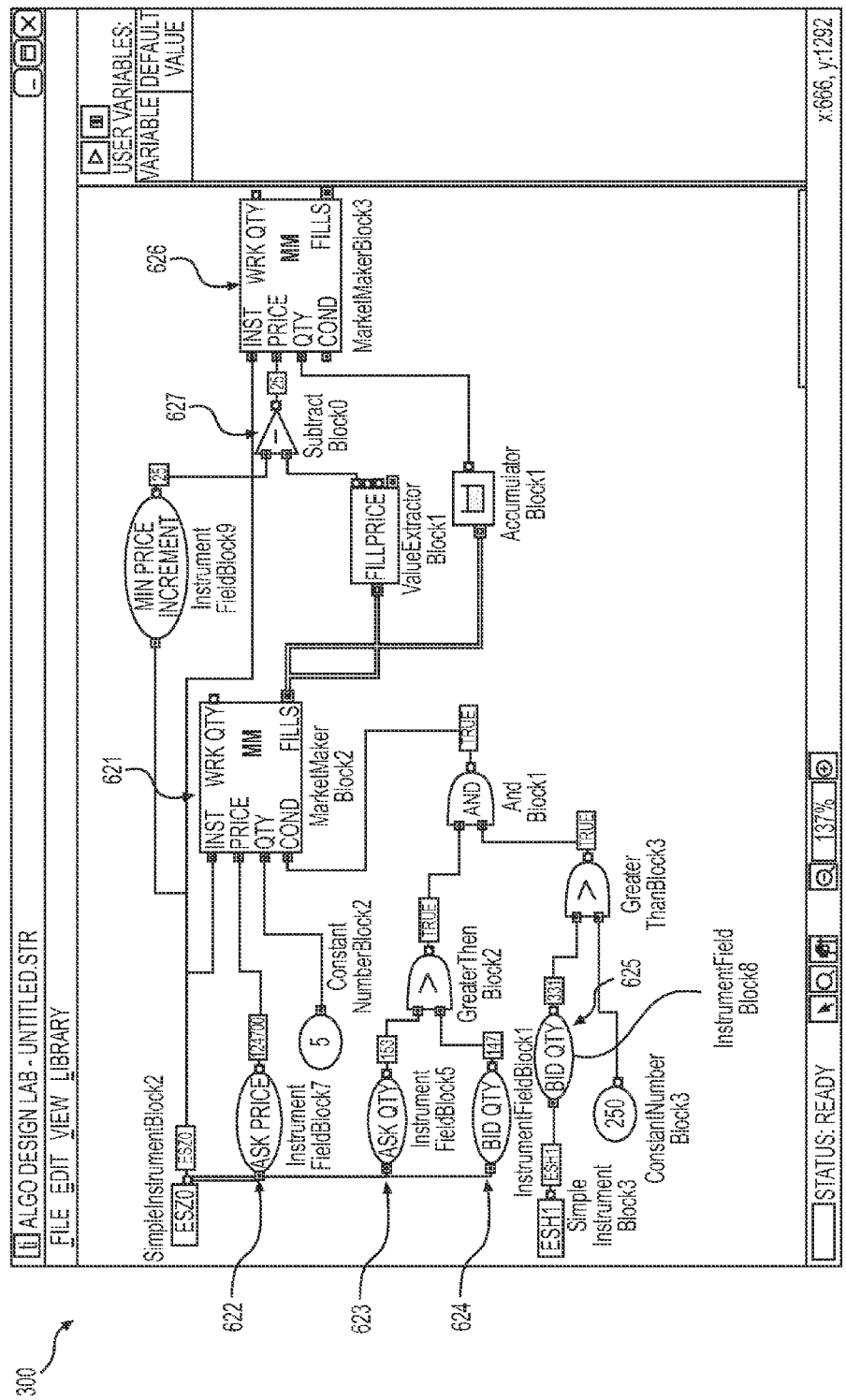

FIGS. 6A-6B illustrate a trading interface 300 according to certain embodiments. As illustrated in FIG. 6A, the trading interface 300 is shown after a block placing tool has be used. The originally placed blocks 611 are the blocks shown in FIG. 3A and are unaltered by the block placing tool. The newly placed blocks 612 are the blocks placed by the block placing tool based on the blocks selected as illustrated in FIG. 3C according to the mapping definition illustrated in FIG. 4F.

As illustrated in FIG. 6B, trading interface 300 has been zoomed to show only the newly placed blocks 612. The buy market maker block 321 and the sell market maker block 326 have been mapped to the sell market maker block 621 and the buy market maker block 626, respectively, according to mapping 451. The instrument field block 322 with the "Bid Price" attribute has been mapped to the instrument field block 622 with the "Ask Price" attribute, according to mapping 452. The instrument field block 323 and the instrument field block 325, each with the "Bid Quantity" attribute, have been mapped to the instrument field block 623 and the instrument field block 626, respectively, each with the "Ask Quantity" attribute, according to mapping 453. The instrument field block 324 with the "Ask Quantity" attribute has been mapped to the instrument field block 624 with the "Bid Quantity" attribute, according to mapping 454. The adder block 327 has been mapped to the subtract block 627, according to mapping 455. For the other blocks in the selection of blocks illustrated in FIG. 3C, these blocks were not specified in the mapping definition and thus the block placing tool just placed copies of those blocks.

The components, elements, and/or functionality of the interfaces 300 and 400 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer, one or more computing devices, or other processing device.

Figure 7:
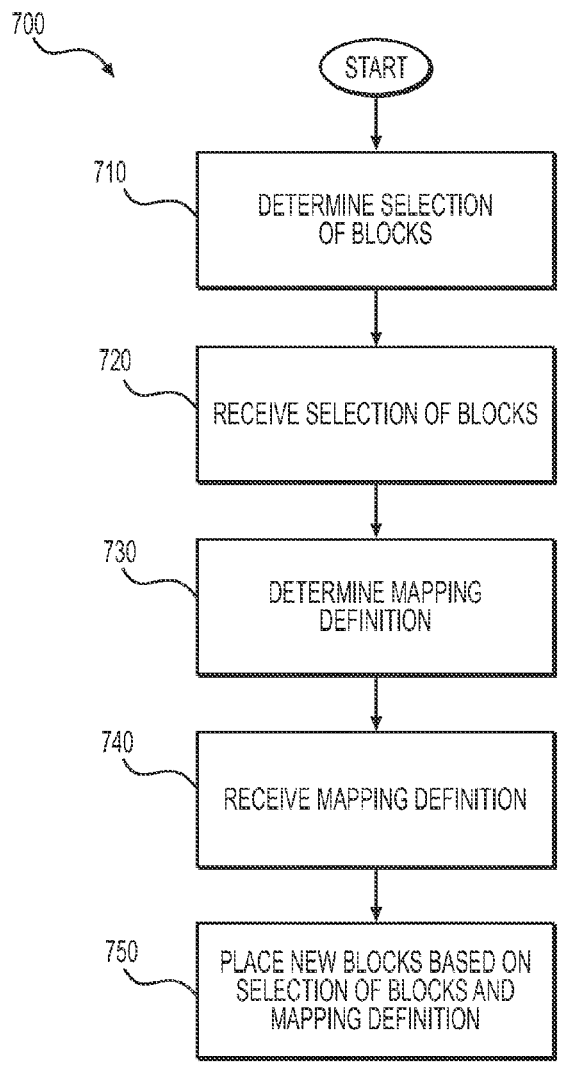
FIG. 7 illustrates a flowchart of a method according to certain embodiments.

FIG. 7 illustrates a flowchart 700 of a method according to certain embodiments. Some or all of the method illustrated in the flowchart 700 may be performed by a block placing tool, for example. The method is described with reference to elements of systems discussed above, but it should be understood that other implementations are possible. The flowchart 700 for the method begins at block 710.

At block 710, a selection of blocks is determined. The selection of blocks may be determined as discussed above, for example. In certain embodiments, the selection of blocks is determined by a user. In certain embodiments, the selection of blocks is determined by a block placing tool. The method then proceeds to block 720.

At block 720, the selection of blocks is received. The received selection of blocks may be, or may be based on, the selection of blocks determined at block 710 discussed above, for example. The method then proceeds to block 730.

At block 730, a mapping definition is determined. The mapping definition may be determined as discussed above, for example. In certain embodiments, the mapping definition is determined by a user. In certain embodiments, the mapping definition is determined by a block placing tool. The method then proceeds to block 740.

At block 740, the mapping definition is received. The received mapping definition may be, or may be based on, the mapping definition determined at block 730 discussed above, for example. The method then proceeds to block 750.

At block 750, the new blocks are placed based on the selection of blocks and the mapping definition. The selection of blocks may be the selection of blocks received at block 720 discussed above, for example. The mapping definition may be the mapping definition received at block 740 discussed above, for example. One or more new blocks may be placed by a block placing tool as discussed above, for example. In certain embodiments, a block placing tool uses the method illustrated by the flowchart 500 in FIG. 5, discussed above.

One or more of the blocks of the flow chart 700 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, EPROM, and/or file server, for execution on a general purpose computer, one or more computing devices, or other processing device.

Certain embodiments may omit one or more of these blocks and/or perform the blocks in a different order than the order listed. For example, some blocks may not be performed in certain embodiments. As a further example, certain blocks may be performed in a different temporal order, including simultaneously, than listed above.

IV. Example computing Device

Figure 8:
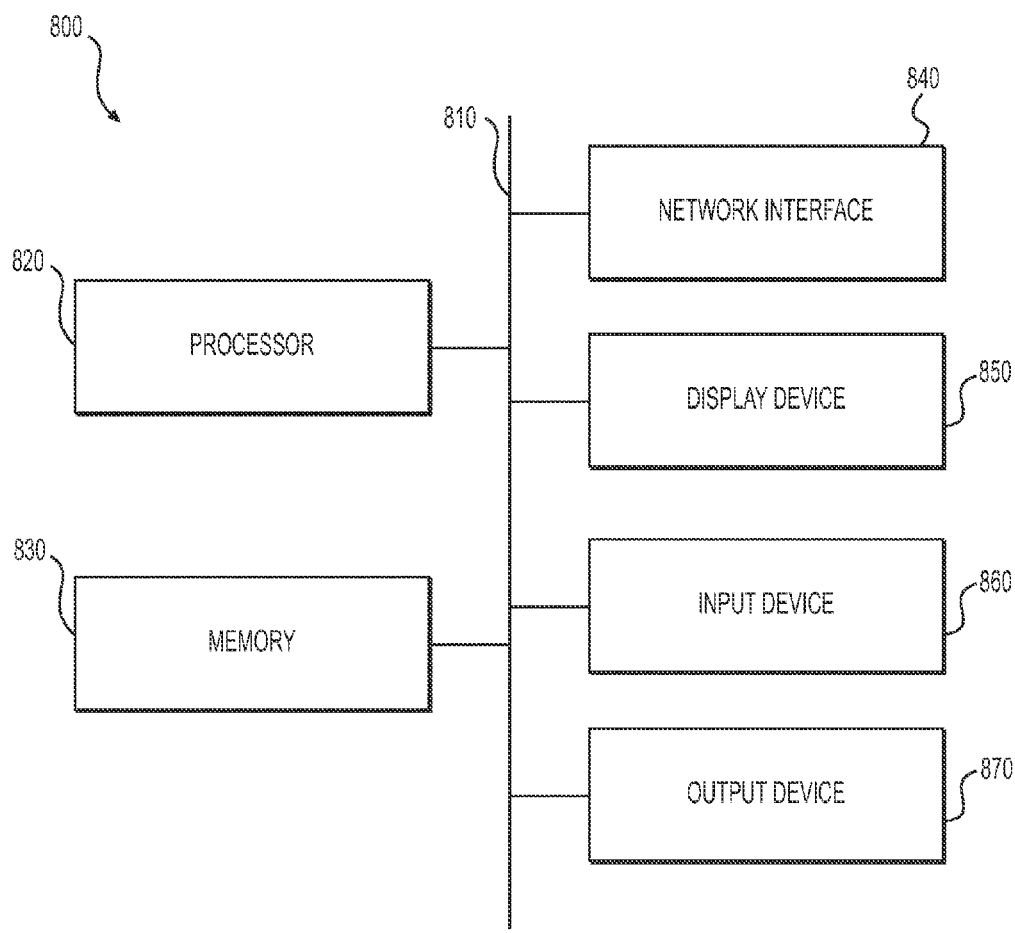
FIG. 8 illustrates a block diagram of a computing device according to certain embodiments.

FIG. 8 illustrates a block diagram of a computing device 800 according to certain embodiments. The client device 110 may include one or more computing devices 800, for example. The client device 201 may include one or more computing devices 800, for example. The algorithm server 202 may include one or more computing devices 800, for example. The gateway 120 may include one or more computing devices 800, for example. The exchange 130 may include one or more computing devices 800, for example. The exchange 203 may include one or more computing devices 800, for example.

The computing device 800 includes a bus 810, a processor 820, a memory 830, a network interface 840, a display device 850, an input device 860, and an output device 870. The computing device 800 may include additional, different, or fewer components. For example, multiple buses, multiple processors, multiple memory devices, multiple network interfaces, multiple display devices, multiple input devices, multiple output devices, or any combination thereof, may be provided. As another example, the computing device 800 may not include an output device 870 separate from the display device 850. As another example, the computing device 800 may not include a display device 850. As another example, the computing device 800 may not include an input device 860. Instead, for example, the computing device 800 may be controlled by an external or remote input device via the network interface 840.

The bus 810 may include a communication bus, channel, network, circuit, switch, fabric, or other mechanism for communicating data between components in the computing device 800. The bus 810 may be communicatively coupled with and transfer data between any of the components of the computing device 800. For example, during an installation process of a trading application, one or more computer-readable instructions that are to be executed by the processor 820 may be transferred from an input device 860 and/or the network interface 840 to the memory 830. When the computing device 800 is running or preparing to run the trading application stored in the memory 830, the processor 820 may retrieve the instructions from the memory 830 via the bus 810.

The processor 820 may include a general processor, digital signal processor, application specific integrated circuit, field programmable gate array, analog circuit, digital circuit, programmed processor, combinations thereof, or other now known or later developed processing device. The processor 820 may be a single device or a combination of devices, such as associated with a network or distributed processing. Any processing strategy may be used, such as multi-processing, multi-tasking, parallel processing, and/or remote processing, for example. Processing may be local or remote and may be moved from one processor to another processor.

The processor 820 may be operable to execute logic encoded in one or more tangible media, such as memory 830 and/or via network device 840. As used herein, logic encoded in one or more tangible media includes instructions that are executable by the processor 820 or a different processor. The logic may be stored as part of software, hardware, integrated circuits, firmware, and/or micro-code, for example. The logic may be received from an external communication device via a communication network, for example, connected to the Internet. The processor 820 may execute the logic to perform the functions, acts, or tasks illustrated in the figures or described herein.

The memory 830 may be tangible media, such as computer readable storage media, for example. Computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, any combination thereof, or any other now known or later developed tangible data storage device. The memory 830 may include a single device or multiple devices. For example, the memory 830 may include random access memory and hard drive storage. The memory 830 may be adjacent to, part of, programmed with, networked with, and/or remote from processor 820, such that data stored in the memory 830 may be retrieved and processed by the processor 820, for example.

The memory 830 may store instructions that are executable by the processor 820. The instructions may be executed to perform one or more of the acts or functions described herein or shown in the figures.

The network interface 840 may be a one-way or two-way communication coupling. Accordingly, the network interface 840 may communicatively connect one, two, or more communication networks or devices. For example, the bus 810 may be coupled with a gateway similar to gateway 120 discussed above via the network interface 840, such that one, some, or all of the components of the computing device 800 are accessible or can communicate with the gateway. As another example, the network interface 840 may couple the bus 810 with other communication networks. The network interface 840 may be, for example, an integrated services digital network (ISDN) card or a modem to provide a data communication connection. As another example, network interface 840 may be a local area network (LAN) card to provide a data communication connection to a compatible LAN, for example, connected to the Internet. Wireless links may also be implemented. The network interface 840 may send and receive electrical, electromagnetic, or optical signals that carry analog or digital data streams representing various type of information, for example.

The display device 850 may include a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, transparent display device, and/or other now known or later developed display, for example.

The display device 850 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 850 and/or input device 860 may be used to interact with the trading screen, for example.

The input device 860 may include a keyboard, mouse, microphone, touch-screen, trackball, keypad, joystick, and/or other device for providing input, for example. The input device 860 may be used, for example, to provide command selections to processor 820. For example, the input device 860 may be a mouse that is used to control a cursor displayed on a trading screen. The mouse may include one or more buttons for selection and control, for example.

The output device 870 may include a keyboard, mouse, speakers, touch-screen, trackball, keypad, haptic device or system, joystick, and/or other device for providing output, for example. For example, the output device 870 may be used to output one or more signals, such as a haptic signal or an audio signal, to a user.

While the present inventions have been described with reference to certain embodiments, it will be understood by those skilled in the art that various changes may be made and equivalents may be substituted without departing from the scope of the inventions. In addition, many modifications may be made to adapt a particular situation or material to the teachings of the inventions without departing from their scope. Therefore, it is intended that the inventions not be limited to the particular embodiments disclosed, but that the inventions will include all embodiments falling within the scope of the claims.

The invention claimed is:

1. A non-transitory computer readable medium having stored therein instructions executable by a processor, wherein the instructions are executed to:
   receive a selection of blocks, wherein the selection of blocks includes at least one block of a plurality of placed blocks in a design canvas area, wherein the plurality of placed blocks are arranged to specify a definition for a trading algorithm, wherein each block in the selection of blocks has a block type;
   receive a mapping definition, wherein the mapping definition includes at least one mapping, wherein each mapping in the mapping definition specifies a relationship between a first type and a corresponding second type, wherein the first type includes a first block type, wherein the second type includes a second block type;
   receive a command to activate a block placing tool; and, in response to receiving the command to activate the block placing tool, for each selected block in the selection of blocks the instructions are executable to:
   determine whether the block type of the selected block conforms to a mapping in the mapping definition;
   determine a new block type, wherein the new block type is the corresponding block type specified in the mapping when the block type of the selected block conforms to the mapping and the new block type is the block type of the selected block when the block type of the selected block does not conform to a mapping in the mapping definition; and
   place a new block of the determined new block type in the design canvas area.

2. The computer readable medium of claim 1, wherein the selection of blocks includes all blocks placed in the design canvas area prior to placing a new block.

3. The computer readable medium of claim 1, wherein the selection of blocks is determined by a user.

4. The computer readable medium of claim 1, wherein the instructions are further executed to automatically determine the selection of blocks.

5. The computer readable medium of claim 1, wherein the mapping definition is pre-defined.

6. The computer readable medium of claim 1, wherein the mapping definition is determined by a user.

7. The computer readable medium of claim 1, wherein the instructions are further executed to automatically determine the mapping definition.

8. The computer readable medium of claim 1, wherein the first type includes a first attribute and the second type includes a second attribute for at least one mapping in the mapping definition.

9. The computer readable medium of claim 1, wherein the mapping definition is received before the selection of blocks is received.

10. The computer readable medium of claim 1, wherein the selection of blocks and the mapping definition are received as part of the command to activate the block placing tool.

11. The computer readable medium of claim 1, wherein the selection of blocks is received before the command to activate the block placing tool is received.

12. The computer readable medium of claim 1, wherein the mapping definition is received as part of the command to activate the block placing tool.

\* \* \* \* \*